US012713112B2

(12) United States Patent
Henn et al.

(10) Patent No.: US 12,713,112 B2
(45) Date of Patent: Aug. 18, 2026

(54) SYSTEM AND A METHOD FOR GENERATING AND DISTRIBUTING MULTIMEDIA CONTENT

(71) Applicant: CrowdClip IP Pty Ltd, Perth (AU)

(72) Inventors: Naomi Francesca Rosa Henn, Perth (AU); Timothy Michael Munk, Perth (AU); Mark Arthur Thompson, Perth (AU); Kevin Wolf, Perth (AU); William P. Tai, Perth (AU); Scott Alexander, Perth (AU)

(73) Assignee: CrowdClip IP Pty Ltd, Perth (AU)

( * ) Notice: Subject to any disclaimer, the term of this patent is extended or adjusted under 35 U.S.C. 154(b) by 0 days.

(21) Appl. No.: 18/331,899

(22) Filed: Jun. 8, 2023

(65) Prior Publication Data

US 2023/0336845 A1 Oct. 19, 2023

Related U.S. Application Data

(63) Continuation of application No. PCT/AU2021/051462, filed on Dec. 8, 2021.

(30) Foreign Application Priority Data

Dec. 9, 2020 (AU) ................................ 2020904580

(51) Int. Cl.
*H04N 21/8549* (2011.01)
*H04N 21/231* (2011.01)
(Continued)

(52) U.S. Cl.
CPC ....... *H04N 21/8549* (2013.01); *H04N 21/231* (2013.01); *H04N 21/23418* (2013.01);
(Continued)

(58) Field of Classification Search
CPC ............. H04N 21/8549; H04N 21/231; H04N 21/8456; H04N 21/472; H04N 21/6332;
(Continued)

(56) References Cited

U.S. PATENT DOCUMENTS 9,374,411 B1 * 6/2016 Goetz ..................... H04L 67/02
2012/0219271 A1 * 8/2012 Vunic ..................... G06V 20/49
704/235
(Continued)

OTHER PUBLICATIONS

International Search Report and Written Opinion issued in the PCT/AU2021/051462.
(Continued)

*Primary Examiner* — Pinkal R Chokshi
(74) *Attorney, Agent, or Firm* — FOLEY & LARDNER LLP

(57) ABSTRACT

Systems and methods are provided herein for generating and storing secondary content implemented by a content server having a data storage, including defining secondary content as media content created from the combination of media portions and storing the secondary content metadata in the data storage of the content server. The secondary content metadata enables the content server to subsequently generate the secondary content by obtaining and extracting the defined media portions from the primary content stored in the data storage and merging the extracted portions.

18 Claims, 22 Drawing Sheets

(51) Int. Cl.
*H04N 21/234* (2011.01)
*H04N 21/235* (2011.01)
*H04N 21/239* (2011.01)
*H04N 21/472* (2011.01)
*H04N 21/6332* (2011.01)
*H04N 21/845* (2011.01)

(52) U.S. Cl.
CPC ..... *H04N 21/2353* (2013.01); *H04N 21/2393* (2013.01); *H04N 21/472* (2013.01); *H04N 21/6332* (2013.01); *H04N 21/8456* (2013.01)

(58) Field of Classification Search
CPC ......... H04N 21/2393; H04N 21/23418; H04N 21/2353
See application file for complete search history.

(56) References Cited

U.S. PATENT DOCUMENTS

2015/0243326 A1 8/2015 Pacurariu et al.
2016/0105708 A1* 4/2016 Packard ........... H04N 21/23424 725/10
2016/0306858 A1* 10/2016 Scapa ..................... G06F 21/10
2017/0048581 A1* 2/2017 Kim ................. H04N 21/41407
2017/0110151 A1 4/2017 Matias et al.
2017/0228600 A1 8/2017 Syed et al.
2018/0152736 A1* 5/2018 Alexander ......... H04N 21/6587
2018/0249218 A1 8/2018 Sayman
2018/0301169 A1* 10/2018 Ricciardi ............. G11B 27/036
2019/0013047 A1 1/2019 Wait et al.
2019/0122699 A1 4/2019 Matias et al.
2019/0174099 A1 6/2019 Hodge et al.
2020/0045382 A1* 2/2020 Montgomery ..... H04N 21/4394
2021/0385558 A1* 12/2021 Walker ............... H04N 21/8547
2023/0254524 A1* 8/2023 Hosoda ................. G06F 3/0481 725/116

OTHER PUBLICATIONS

Extended European Search Report dated Oct. 10, 2024 issued in corresponding EP Application No. 21901706.8, 8 pages.

* cited by examiner

SYSTEM AND A METHOD FOR GENERATING AND DISTRIBUTING MULTIMEDIA CONTENT

CROSS-REFERENCE TO RELATED APPLICATIONS

This application claims the benefit of priority to International Application No. PCT/AU2021/051462, filed on Aug. 12, 2021, which claims the benefit of Australian Patent Application No. 2020904580, filed Dec. 9, 2020, all of which are hereby incorporated by reference in their entirety.

FIELD OF THE INVENTION

The present invention generally relates to a system and a method for generating multimedia content.

BACKGROUND TO THE INVENTION

Processing existing multimedia content to create a new multimedia content based on extracts from the existing multimedia content can be a daunting and cumbersome task, requiring an extensive amount of time and device memory (e.g., memory of a computer). For example, user created content can result in significant demands on both computer processing resources and data storage resources.

SUMMARY OF THE INVENTION

One or more embodiments herein described generally relate to a method for generating and storing secondary content implemented by a content server having a data storage. In a broad sense, the method may comprise the steps of: storing, in the data storage, one or more pieces of primary content received by the content server, wherein received pieces of primary content are processed to identify a set of one or more feature instances, each feature instance associated with a predefined feature and defining a position within the respective piece of primary content at which said associated feature is present; receiving, from a first client device in data communication with the content server, a search request, the search request specifying one or more search features; determining one or more pieces of primary content for searching in relation to the search request; identifying one or more feature instances in the searched primary content having an associated feature instance corresponding to one or more search features; communicating an instruction to the first client device to display on a user interface of the client device a representation of the identified one or more feature instances; receiving, from the first client device, an ordered selection of one or more of the identified feature instances; determining, for the, or each, selected identified feature instance a corresponding media portion corresponding to a portion of the primary media defined by the position associated with the particular selected feature instance; creating a secondary content metadata defining, according to the ordered selection, the combination of the one or more determined media portions, thereby defining secondary content being media content created from the combination of media portions; and storing the secondary content metadata in the data storage of the content server, wherein the secondary content metadata enables the content server to subsequently generate the secondary content by obtaining and extracting the defined media portions from the primary content stored in the data storage and merging the extracted portions.

Optionally, the method further comprises the steps of: receiving a request from the first client device or a second client device different to the first client device to generate and communicate the secondary content; constructing the secondary content, based on the associated secondary content metadata, from the stored primary content; and communicating the secondary content to the requesting client device. Optionally, the method further comprises the steps of: receiving a request from the first client device or a second client device to generate and communicate the secondary content; constructing the secondary content, based on the secondary content metadata, from the stored primary content; and streaming the secondary content to the requesting client device, wherein the secondary content is not intended for permanent storage on the client device. The secondary content metadata may define one or more required content elements, separate to the selected identified feature instance(s), and the secondary content may be constructed to include both the one or more required content and the one or more media portions associated with the one or more selected identified feature instances. The method may further comprise the step of providing a template defining an arrangement of one or more user regions and one or more owner regions, the one or more user regions may each allow for a user to select, via the client device, feature instances for the user region when creating a secondary content metadata, whereas the one or more owner regions may define the inclusion of one or more required content elements not selectable by the user. The template may define at least one of the one or more owner regions as a conditional owner region comprising condition required content, and the method may further comprise: determining, for the at least one conditional owner region, required content for use with the conditional owner region when constructing the secondary content based on conditional rules associated with the conditional owner region. Conditional rules may be selected from one or more of: one or more rules based on a number of creations of secondary content metadata based on one or more pieces of primary content; one or more rules based on a number of times secondary content has been construction from the associated secondary content metadata; one or more rules based on an elapsed time since creation of the secondary content metadata; and one or more rules based on the presence of a feature instance. A template may define a subset of stored primary content to which feature instance selections are available. The method may further comprise providing a content owner interface to enable a content owner to create and make available one or more templates to one or more users.

Optionally, the identified one or more feature instances include at least a first identified feature instance from a first piece of primary content and a second identified feature instance from a second piece of primary content different to the first piece of primary content. The content sever may restrict possible identified feature instances based on access rights associated with the client device, and the access rights may be determined in accordance with user information provided in association with the client device.

Optionally, the identified one or more feature instances are restricted to each being associated with a same piece of primary content.

Optionally, the method further may comprise the step of: creating and storing analytics data based on: the, or each, piece of primary content associated with a feature instance of the secondary content metadata.

Optionally, the method further may comprise the step of: creating and storing analytics data based on: each instance of construction of secondary content.

Optionally, the method further may comprise, for the or each media portion, determining, based on a predefined rule, a portion size of the associated primary content for assignment to the media portion. The method may further comprise communicating an interface to the first user device to enable a user to change the portion size of the associated piece of primary content for assignment to the media portion with respect to the portion size determined according to the predefined rule.

Optionally, the method further may comprise the steps of: providing an interface to receive pieces of primary content from client devices; upon receiving a piece of primary content: processing the received piece of primary content to identify a set of feature instances, each feature instance associated with a feature and defining a position within the respective piece of primary content at which said associated feature is present. Each feature may be associated with a trained feature identifier configured for identifying instances of that feature in the primary content. The method may further comprise determining one or more predefined features, and identifying features instances associated with the one or more predefined features. The method may further comprise receiving, from the client device, a user selection of one or more features, and identifying features instances associated with the one or more user selected features.

Optionally, the method further may comprise the step of maintaining a user profile for at least one, preferably all, users accessing the content server, the user profile being updated in accordance with an assessment of preferences of the user in relation to selection of feature instances for secondary content and/or preferences of the user in relation to feature instances associated with secondary content viewed and/or shared by the user.

Optionally, the method further may comprise the step of caching secondary content for a predetermined or calculated time after a most recent request for access to said secondary content.

Optionally, the method further may comprise maintaining a user homepage for presentation to the user on the first client device when accessing the content server, the user home page having one or more of: a previous content area enabling selection by the user of one or more previous pieces of primary content provided to the content server by the user and/or secondary content created by the user; an other user content section enabling selection by the user of one or more previous pieces of primary content provided to the content server by one or more other users and/or secondary content created by one or more other users; and a content owner section enabling selection by the user of one or more templates made available by one or more content owners for use by the user in creating secondary content.

Optionally, the method further may comprise enabling association of auxiliary data with each piece of primary content and/or each piece of secondary content, wherein the auxiliary data is utilised in determining search results.

Optionally, the method further may comprise providing one or more sub-systems, wherein a client device interacts with a sub-system when interacting with the content server, each associated with a content owner, where the content owner of a particular sub-system is enabled to control access to primary content to users accessing its associated sub-system and/or control the creation of secondary content by said users. A sub-system may be associated with access to the content server via an interface, such as via an application programming interface (API), software development kit (SDK), and/or iframe, such that a content owner is enabled to make the sub-system accessible to users via a web resource of the content owner, such as a website or a mobile application ("app").

The primary content and the secondary content may comprise video media.

Additionally, one or more embodiments herein described generally relate to a content creation system comprising a content server in network communication with one or more client devices via a network. In a broad sense, the content server may be configured to: store, in a data storage of the content server, one or more pieces of primary content received by the content server, wherein received pieces of primary content are processed by the content server to identify a set of one or more feature instances, each feature instance associated with a predefined feature and defining a position within the respective piece of primary content at which said associated feature is present; receive, from a first client device in data communication with the content server, a search request, the search request specifying one or more search features; determine one or more pieces of primary content for searching in relation to the search request; identify one or more feature instances in the searched primary content having an associated feature instance corresponding to one or more search features; communicate an instruction to the first client device to display on a user interface of the client device a representation of the identified one or more feature instances; receive, from the first client device, an ordered selection of one or more of the identified feature instances; determine, for the, or each, selected identified feature instance a corresponding media portion corresponding to a portion of the primary media defined by the position associated with the particular selected feature instance; create secondary content metadata defining, according to the ordered selection, the combination of the one or more determined media portions, thereby defining secondary content being media content created from the combination of media portions; and store the secondary content metadata in the data storage of the content server, wherein the secondary content metadata enables the content server to subsequently generate the secondary content by obtaining and extracting the defined media portions from the primary content stored in the data storage and merging the extracted portions.

Optionally, the content server is further configured to: receive a request from the first client device or a second client device different to the first client device to generate and communicate the secondary content; construct the secondary content, based on the associated secondary content metadata, from the stored primary content; and communicate the secondary content to the requesting client device. Optionally, the content server is further configured to: receive a request from the first client device or a second client device to generate and communicate the secondary content; construct the secondary content, based on the secondary content metadata, from the stored primary content; and stream the secondary content to the requesting client device, wherein the secondary content is not intended for permanent storage on the client device. The secondary content metadata may define one or more required content elements, separate to the selected identified feature instance(s), and the secondary content may be constructed to include both the one or more required content and the one or more media portions associated with the one or more selected identified feature instances. The content server may be further configured to: provide a template defining an arrangement of one or more user regions and one or more owner regions, the one or more user regions may each allow for a user to select, via the client device, feature instances for the user region when creating a secondary content metadata, whereas the one or more owner regions define the inclusion of one or more required content elements not selectable by the user. A template may define at least one of the one or more owner regions as a conditional owner region comprising condition required content, and the content server may be further configured to: determine, for the at least one conditional owner region, required content for use with the conditional owner region when constructing the secondary content based on conditional rules associated with the conditional owner region. Conditional rules may be selected from one or more of: one or more rules based on a number of creations of secondary content metadata based on one or more pieces of primary content; one or more rules based on a number of times secondary content has been construction from the associated secondary content metadata; one or more rules based on an elapsed time since creation of the secondary content metadata; and one or more rules based on the presence of a feature instance. A template may define a subset of stored primary content to which feature instance selections are available. The content server may be further configured to provide a content owner interface to enable a content owner to create and make available one or more templates to one or more users. The identified one or more feature instances may include at least a first identified feature instance from a first piece of primary content and a second identified feature instance from a second piece of primary content different to the first piece of primary content. The content sever may be configured to restrict possible identified feature instances based on access rights associated with the client device, and the access rights may be determined in accordance with user information provided in association with the client device. The identified one or more feature instances may be restricted to each being associated with a same piece of primary content.

Optionally, the content server is further configured to: create and store analytics data based on: the, or each, piece of primary content associated with a feature instance of the secondary content metadata. Optionally, the content server is further configured to: create and store analytics data based on: each instance of construction of secondary content.

Optionally, the content server is further configured to, for the or each media portion, determine, based on a predefined rule, a portion size of the associated primary content for assignment to the media portion. The content server may be further configured to communicate an interface to the first user device to enable a user to change the portion size of the associated piece of primary content for assignment to the media portion with respect to the portion size determined according to the predefined rule.

Optionally, the content server is further configured to: provide an interface to receive pieces of primary content from client devices; upon receiving a piece of primary content: process the received piece of primary content to identify a set of feature instances, each feature instance associated with a feature and defining a position within the respective piece of primary content at which said associated feature is present. Each feature may be associated with a trained feature identifier configured for identifying instances of that feature in the primary content. The content server may be further configured to determine one or more predefined features, and identify features instances associated with the one or more predefined features. The content server may be further configured to receive, from the client device, a user selection of one or more features, and identify features instances associated with the one or more user selected features.

Optionally, the content server is further configured to: maintain a user profile for at least one, preferably all, users accessing the content server, the user profile being updated in accordance with an assessment of preferences of the user in relation to selection of feature instances for secondary content and/or preferences of the user in relation to feature instances associated with secondary content viewed and/or shared by the user.

Optionally, the content server is further configured to: cache secondary content for a predetermined or calculated time after a most recent request for access to said secondary content.

Optionally, the content server is further configured to maintain a user homepage for presentation to the user on the first client device when accessing the content server, the user home page having one or more of: a previous content area enabling selection by the user of one or more previous pieces of primary content provided to the content server by the user and/or secondary content created by the user; an other user content section enabling selection by the user of one or more previous pieces of primary content provided to the content server by one or more other users and/or secondary content created by one or more other users; and a content owner section enabling selection by the user of one or more templates made available by one or more content owners for use by the user in creating secondary content.

Optionally, the content server is further configured to enable association of auxiliary data with each piece of primary content and/or each piece of secondary content, wherein the auxiliary data is utilised in determining search results.

Optionally, the content server is further configured to provide one or more sub-systems, wherein a client device interacts with a sub-system when interacting with the content server, each associated with a content owner, where the content owner of a particular sub-system is enabled to control access to primary content to users accessing its associated sub-system and/or control the creation of secondary content by said users. A sub-system may be associated with access to the content server via an interface, such as via an application programming interface (API), software development kit (SDK), and/or iframe, such that a content owner is enabled to make the sub-system accessible to users via a web resource of the content owner, such as a website or a mobile application ("app").

Optionally, the primary content and the secondary content comprise video media.

The methods herein described may be embodied by a computer program. For example, a computer program comprising code configured to cause a computer to implement the herein described method(s).

For example, a non-transient computer readable storage medium may be provided according to one or more embodiments comprising code configured to cause a computer processor to generate and store secondary content in a data storage interfaced with the computer processor. For example, said code may be configured to cause the computer to: store, in a data storage of the content server, one or more pieces of primary content received by the content server, wherein received pieces of primary content are processed by the content server to identify a set of one or more feature instances, each feature instance associated with a predefined feature and defining a position within the respective piece of primary content at which said associated feature is present;

receive, from a first client device in data communication with the content server, a search request, the search request specifying one or more search features; determine one or more pieces of primary content for searching in relation to the search request; identify one or more feature instances in the searched primary content having an associated feature instance corresponding to one or more search features; communicate an instruction to the first client device to display on a user interface of the client device a representation of the identified one or more feature instances; receive, from the first client device, an ordered selection of one or more of the identified feature instances; determine, for the, or each, selected identified feature instance a corresponding media portion corresponding to a portion of the primary media defined by the position associated with the particular selected feature instance; create secondary content metadata defining, according to the ordered selection, the combination of the one or more determined media portions, thereby defining secondary content being media content created from the combination of media portions; and store the secondary content metadata in the data storage of the content server, wherein the secondary content metadata enables the content server to subsequently generate the secondary content by obtaining and extracting the defined media portions from the primary content stored in the data storage and merging the extracted portions.

The present disclosure may include additional novel embodiments separate and/or related to those of the embodiments described in general terms above. For example, there is described a system for generating multimedia content, the system comprising: server including: a data storage; and a processor in communication with the data storage, the processor being configured to: receive primary content; analyse the primary content to identify a set of features in the primary content; extract a respective set of time data elements associated with the identified set of features; receive a selection input indicative of a selection of an array of time data elements from the extracted set of time data elements; and generate secondary multimedia content based on the received input selection. In another example, there is disclosed a method for generating multimedia content, the method comprising: receiving primary content; analysing the primary content to identify a set of features associated with elements of the primary content; extracting a set of time data elements associated with the identified set of features; receiving a selection input indicative of a selection of an array of time data elements from the extracted set of time data elements; and generating secondary multimedia content based on the received input selection.

As used herein, the word “comprise” or variations such as “comprises” or “comprising” is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawings, in which.

DESCRIPTION OF EMBODIMENTS

Figure 1:
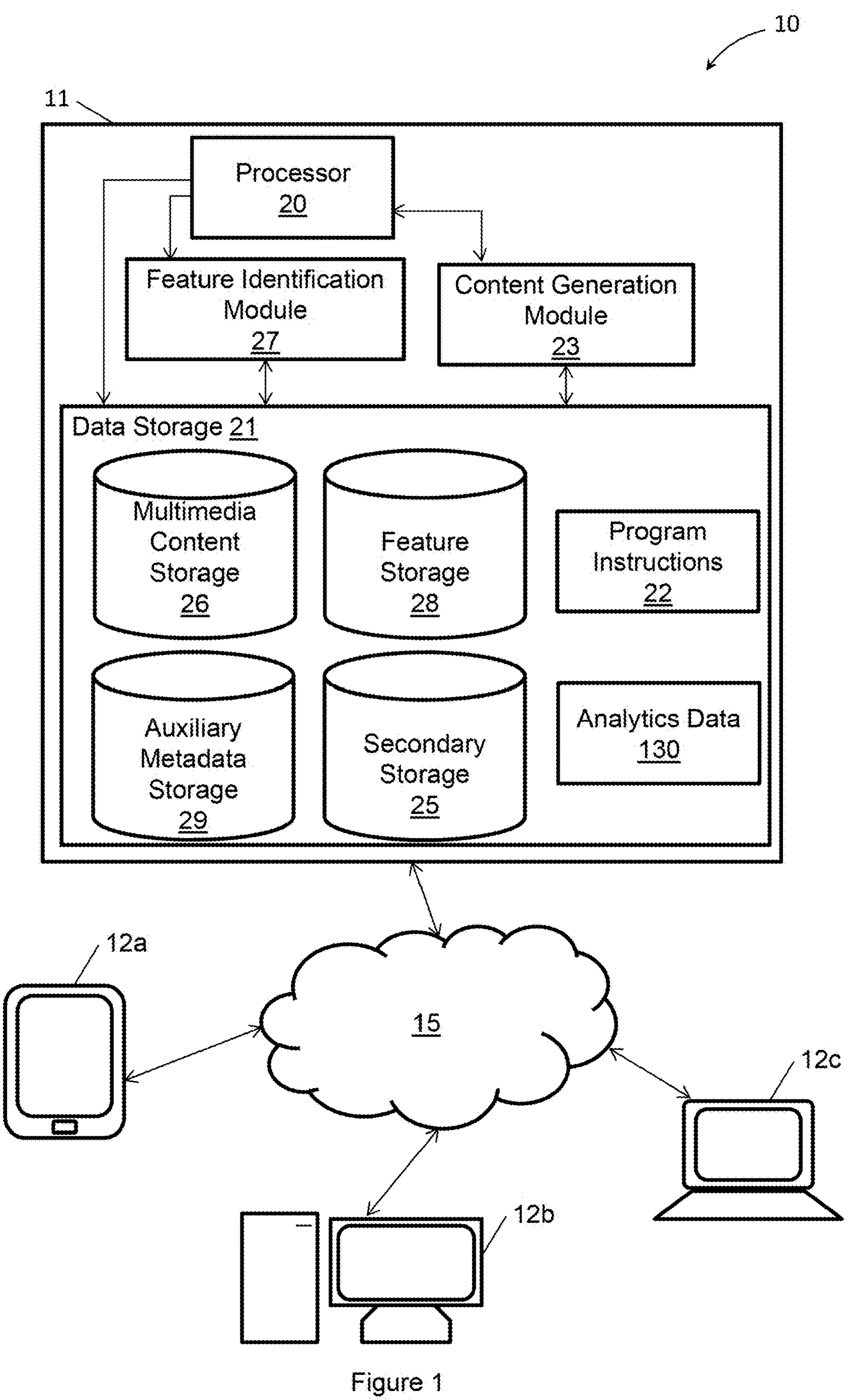
FIG. 1 shows a block diagram of a multimedia content generation system according to an embodiment.

FIG. 1 shows a schematic block diagram of a multimedia content generation system 10 in accordance with an embodiment of the present invention. The system 10 comprises a content server 11 in data communication with one or more client devices 12 via network 15. The network 15 is any data communication network suitable for the transfer of information (data) between the client devices 12 and the server 11. In a specific example, the communications network 15 comprises the Internet. The network 15 can also, or instead, comprise private intranets and the like.

For the purposes of this disclosure, specific instances of an element referenced in the drawings are identifiable by a unique suffix whereas a general reference excludes a suffix and is understood to encompass each of the particular element. For example, client devices 12 can be referred to generally without a suffix (i.e. no suffix appended to the value “12”), whereas specific reference can be made to client device 12*a*, client device 12*b*, and client device 12*c* (or equivalently, client devices 12*a*-12*c*).

Client devices 12 are typically a computing device suitable for data communication with content server 11 via network 15. Examples include personal computers, laptops, smartphones, tablets, and smart watches. The client devices 12 provide a client interface for enabling users of the client devices 12 to interact with the content server 11 according to the embodiments described herein. For example, a client device 12 can be configured to access a web server (not shown) associated with the content server 11 via a web browser application running on the client device 12, the resulting web page(s) providing the client interface to enable the visiting client device 12 to interact with the content server 11. A client device 12 can be configured to access an Application Programming Interface (API) running on the server 11 via a purpose-built application (“app”) running on the client device 12, which can be obtained via known mechanisms (e.g. via an online app store), where the app provides the client interface. Typically, and as assumed herein, the client devices 12 are configured to provide a Graphical User Interface (GUI), via an interfaced display, as a part of the client interface to thereby enable a user of a particular client device 12 to interact with the content server 11. The client devices 12 also provide a user input means, for example, selected from one or more of: a touchscreen (typically the same screen used for presenting the GUI); keyboard; and a mouse, although other input mechanisms are anticipated such as via voice command (received by a microphone of the client device 12). It is envisaged that the GUI can be augmented or replaced with an audible interface, such as associated with so-called "virtual assistants". The client devices 12 can communicate with network 15 via a wired and/or wireless data path.

Still referring to FIG. 1, according to an embodiment, the content server 11 comprises a processor 20 interfaced with a data storage 21 (e.g. via a common bus). The data storage 21 is arranged for storing a set of program instructions executable by the processor 20 and for storing data usable by the processor 20, as will be described in more detail below. The data storage 21 is preferably non-transitory such that data and program instructions are retained until overwritten. The processor 20 is also interfaced with a working memory (not shown explicitly), which typically comprises a volatile memory but can also, or alternatively, comprise a non-volatile memory. The program instructions are typically loaded into the working memory, for example when needed or entirely at program initiation, for processing by processor 20. The working memory is additionally utilised to provide a working memory store for transient data storage related to execution of the program instructions 22. The processor 20 is further interfaced with a network interface (not shown) configured to enable communication between the processor 20 and network 15 (and, thereby, client devices 12). The processor 20 is therefore configured to enable the content server 11 to perform the functionality described herein based on programming instructions stored in the interfaced data storage 21. Various modules herein describe are understood as functional units implemented by processor 20 and resident in the working memory.

In one embodiment, the data storage 21 comprises a NoSQL database. However, it will be understood that the data storage 21 in other embodiments can comprise any suitable type of database. Reference to separate databases herein should be understood as encompassing logically distinct databases than can be implemented with a single database environment (or, of course, as entirely separate databases).

The data storage 21 is shown in FIG. 1 as an internal element of content server 11, for example, a magnetic hard disk drive or solid state drive (or, equivalently, a plurality of interlinked magnetic hard disk drives and/or solid state drives). However, it is envisaged that the data storage 21 be distributed across various servers and be accessible to the content server 11 and interconnected to the 20 12. For example, the data storage 21 can comprise a storage element portion directly interfaced with the processor 20 as shown, as well a storage element portion accessible via network 15 (e.g. a cloud storage) (not shown). The content server 11 can be implemented as a virtual server within a cloud computing platform such as Amazon Web Servers™, Google Compute Engine™, or Azure Virtual Machines™, utilising, for example, either or both of the cloud processing functionality and data storage functionality.

Figure 2:
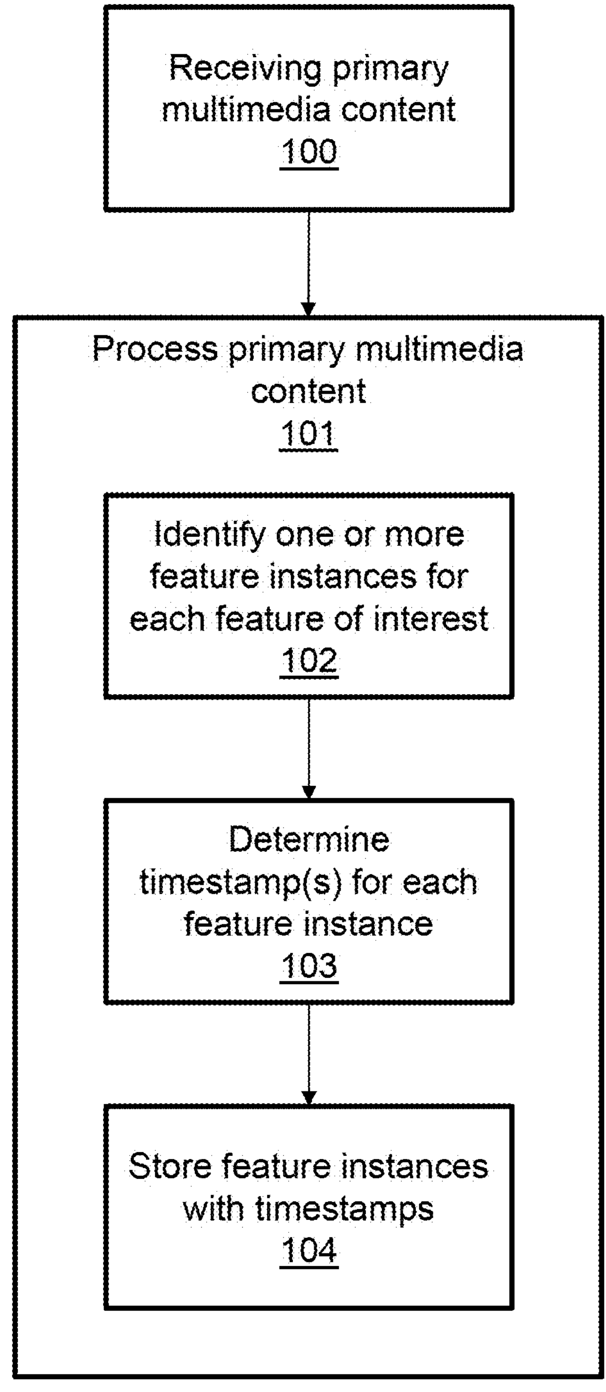
FIG. 2 shows a primary content processing method, according to an embodiment.

FIG. 2 shows a method of processing primary content according to an embodiment. The content server 11 is configured to receive, from client devices 12 (via network 15), "primary content", at step 100. The primary content typically comprises video content (which will often include visual content and audio content), for example, a recording of an event, such as a football match (or other sporting event). However, typically, embodiments herein described do not necessarily require audio content to accompany the visual content. In an embodiment, the primary content can be audio-only content and/or still images. Generally, primary content is content from which "secondary content" (discussed below) is derived.

The primary content can initially be stored on a client device 12 and communicated to ("uploaded to") the content server 11 through the client interface on the client device 12. The primary content can be generated and communicated from a client device 12 that is not a general-purpose computing device as such, such as a camera or video camera with suitable programming to enable upload to the content server 11. The primary content can be made available to the content server 11 via an instruction to access the content from a separate data store; that is, the client device 12 instructs the content server 11 to obtain the multimedia content from a storage which is not directly associated with the client device 12 (e.g. a cloud storage service or other online storage). Therefore, the primary content can be obtained and downloaded from the Internet. The primary content can be present on content server 11 due to a previous upload from the client device 12 or another user's client device 12.

The data storage 21 can be arranged to store the uploaded primary content in multimedia content storage 26 of content server 11. Generally, reference herein to a database can include any suitable storage means for retaining information identifying stored content and, where relevant, metadata and other information related to the content.

To aide in describing specific examples herein, reference is made throughout to a player of Australian Rules Football (AFL) or a team belong to the AFL—it should be understood that such references are not limiting.

Still with reference to FIG. 2, the content server 11 is configured to analyse the primary content to identify a set of features, at step 101. The term "feature" is used herein to refer to identifiable elements in the primary content. Depending on the implementation, "features" can comprise entities which can include persons, animals, or even collections of either (for example, in the form of a sports team). Features can also, or alternatively, comprise identifiable elements common to different entities, for example, selected from: a human face (generally) or a facial expression, such as a smile or a frown. Features can also, or alternatively, include objects such as a ball, a shoe, or other sports equipment. Features can also, or alternatively, include a symbol such as a letter, a number, or a logo. Features can also, or alternatively, include actions such as a kick or a throw. Features can also, or alternatively, include an acoustic element such as a honk, a musical element, a speech element, or a crowd chant. In one example, a plurality of features can be associated with the same human face, such as the mouth and hair of a particular player in a recording of a particular game. Or, a plurality of features can be associated with the same entity, such as a face of the player and a number on the jersey of the player. In another example, one feature can be associated with both a human face and a facial expression, such as a smile in a given human face.

Regarding the processing of the primary content at step 101, in an embodiment still with reference to FIG. 2, the content server 11 is configured, at step 102, to analyse received primary content. In an embodiment, step 102 can be undertaken in response to receiving a search input, generated by a user of a client device 12 inputting via the client interface one or more terms indicative of one or more features to be identified in the primary content. The content server 11 is interfaced with feature identification module 27 configured for identifying features in primary content (the feature identification module 27 can be implemented by processor 20 or, in an embodiment, is provided by an external processor (not shown)). That is, a user can perform a search for "smiles" and the primary content is in response analysed to identify instances in which a smile is present. The particular feature(s) searched for make up a set of features.

In one specific example, a user can input, via a client device 12 accessing the content server 11, a search for a specific AFL player. In response to receiving the user search input, the content server 11 is then arranged to identify instances in the piece of primary content of one or more features associated with the AFL player based on the models stored within the feature identification module 27. The content server 11 can be arranged to identify the AFL player as an entity and in this case can be arranged to use an entity detection model associated with the AFL player—that is, the AFL player is the feature. Alternatively, or additionally, the content server 11 can be arranged to identify the AFL player by identifying at least one or more features associated with the AFL player, but not being the AFL player, such as the jersey number of the AFL player. In this case, the content server 11 is arranged to use both a face detection model associated with the face of the AFL player and a symbol detection model associated with, for example, a number which is characteristic of the AFL player's jersey number. It will be understood that the content server 11 can additionally or alternatively be arranged to use any other learning model trained to identify any other feature associated with the AFL player.

In an embodiment, the primary content is analysed by the content server 11 at step 102 automatically in response to it being uploaded to the content server 11, at least in terms of one or more predefined default features (making up a set of features). In this case, the primary content can be analysed according to predefined terms—for example, according to a list of applicable entities (e.g. people such as players of a particular sports team or league). In this embodiment, the primary content can be associated with a particular event or collection of events and/or entity or collection of entities. For example, a particular sports league (e.g. the AFL) is associated with particular entities—the players and teams that make up the AFL. Therefore, if the primary content is known to be associated with the AFL, it can be analysed on the basis of identifying the presence of players of the AFL and/or teams of the AFL. The content server 11 can be updated when required to remove players and/or teams or add players and/or teams—for example, this can be undertaken at the beginning of a season.

Therefore, the content server 11 is configured to automatically (that is, without a specific user input) identify instances of particular features. For example, a search for features associated with every AFL player can be performed, and features are thereby identified with specific players who can be present within the content segments. This embodiment is expected to be advantageous in relation to a collection (e.g. league) of sports teams where a relatively small number of players are readily associated with a particular sports team and uploaded primary content is expected to include at least some of these players in most cases.

The embodiments described with respect to step 102 can be combined, for example, certain features are automatically searched for upon upload while others are searched in response to a user search query.

According to an embodiment, content server 11 is configured to divide the received primary content into successive individual content segments, and to analyse the resulting individual content segments in parallel (or in groupings where the content segments of each group are processed in parallel, while separate groups are processed in series) for identifying a set of features. The division into content segments can occur as a preliminary step before analysis.

Each individual content segment can have a predetermined duration. In one example, the received primary content is divided into 10-second or 5-second content segments (i.e. the predetermined duration is ten seconds or five seconds, respectively). In another example, the content segments are delineated by key frames (also known as intra-frames) and can therefore, depending on the video encoding format, have a variable length or a fixed length (for example, some video encoders are known which use a fixed ten second length between key frames). For example, a particular segment can begin with a key frame and end at the non-key frame immediacy preceding a next key frame. For ease of disclosure, it is assumed herein that the content segments take a ten second length (there can be variations, for example, a final content segment can be under ten seconds).

The format of the received primary content can vary depending on the device on which it was initially recorded, and the file type of the received primary content can accordingly vary. For example, a resolution that the primary content can have been recorded in can include 4K, 1080p, 1080i, 720p, and non-television standard resolutions. Further the primary content can have been stored using a format such as mpeg-1, mpeg-2, mpeg-4, HEVC, and VP9.

Independent of the original resolution and format of the primary content, to address potential issues resulting from having to process multimedia content having different resolutions and/or formats, the content server 11 is, in an embodiment, configured to convert primary content to a uniform file format (typically defined as a parameter of the system 10). In one embodiment, in a case where one or more of the 10-second content segments are not already of said uniform file format, the processor is arranged to convert these one or more content segments to a common file format (e.g. having the same encoding, resolution, and framerate), for example standard HD format or 720p.

The content server 11 is then arranged to analyse all content segments (having the same common file format and, for example, a predetermined length such as of 10-seconds or 5-seconds), or all content segments of a particular grouping, in parallel, as described above.

In another embodiment, it is envisaged that, in a case where it is not already of said common file format, the primary content is converted to the common file format prior to dividing the primary content into the successive individual content segments.

The primary content is saved to multimedia content storage 26 (which can be a logically distinct portion of data storage 21 as shown in FIG. 1). The primary content can be stored in a manner enabling access to the associated content segments such that the content segments can be used by the content server 11 at any further stage, for example for analysing the content segments to identify another set of features, different from a previously identified set of features. In an embodiment, the primary content is stored in the form of separate content segments rather than one contiguous file in association with segment metadata identifying each content segment of the primary content and the order in which the content segments are arranged. In another embodiment, the primary content is filed as a contiguous file with segment metadata identifying the location of each content segment determined as previously described within the contiguous file. In either case, the combination of storage mode and segment metadata enables the content server 11 to access the primary content and individual content segments at a later time. The segment metadata can be understood as being stored in the multimedia content storage 26.

Advantageously, by dividing the primary content in content segments having a predetermined duration or based on another factor such as key-frame separation and processing all content segments in parallel (or, groupings of content segments in parallel with separate groupings processed in series), the amount of time required for the analysis of all content segments can be reduced. Where sufficient processing resources are available (for example, in a cloud computing environment), the amount of time required for the analysis of the entire primary content may be similar to the processing time of one content segment. Where groupings are utilised, each grouping may advantageously be analysed within a time comparable to the processing of one content segment. Another advantage may be that a system operator is enabled to balance processing requirements and resources against the desirability for a short processing time from a user perspective, by specifying an extent of parallel processing based on the number of content segments per grouping. Optionally, in an implementation, the number of groupings can be set equal to the number of content segments-effectively, this is equivalent to not dividing a piece of primary content and may be preferred where processing resources are insufficient or deemed insufficient for parallel processing. It is expected that a system operator can select a particular approach to parallel processing based on the processing resources of the actual implementation, which can also be dynamically determined based on a processing load currently being experienced by the content server 11.

Referring back to step 102 of FIG. 2, to identify the set of features in each content segment of the primary content, the content server 11 is arranged to use one or more trained learning models, each trained learning model being suitable for the identification of a respective feature. The trained learning models are stored for use by a feature identification module 27 of the content server 11. The content server 11 is arranged to retrieve the trained learning models for use by the feature identification module 27 and the content segments from the data storage 21 in order to proceed with the analysis of the primary content, e.g. the analysis of the 10-second or 5-second content segments. In one example, the feature identification module 27 is arranged to have access to one or more of: a face detection model; a facial expression detection model; an entity detection model; an object detection model; a symbol detection model; an action detection model; a speech element detection model. It will be understood that other trained learning models can alternatively or additionally be stored, including, for example however not limited to, an acoustic element (other than speech) detection model. One or more models can utilise a machine learning detection algorithm suitably trained for identifying the corresponding feature.

In an embodiment, to train the learning models, or to augment earlier training of one or more of the models, the content server 11 is arranged to gather, for each feature, a respective set of training data (in reference to known machine-learning training approaches) associated with the feature. For example, for features A, B, C (respectively associated with, for example, a human face, an entity, an action), the processor is arranged to gather a respective training data $I_A$, $I_B$, $I_C$ associated respectively with the corresponding feature. The training data $I_A$, $I_B$, $I_C$ is stored in a respective feature training database associated with the feature identification module 27 and used by the feature identification module 27 to learn from and train the respective detection models. Each set of feature information can include, for a respective feature, a plurality of images and/or a plurality of sound recordings associated with the feature. That is, the learning models are trained on annotated training data. Typically, the training data is annotated using known techniques.

In one embodiment, the content server 11 is configured to source training data (e.g. a plurality of images (which is understood to include video) and/or a plurality of sound recordings) for use in training from the Internet, such as from particular websites using a search engine on the World Wide Web, or from social media. Additionally, or alternatively, the content server 11 can in some embodiments be configured to source the training data from hardware storage on the client device 12, and/or from the data storage 21, wherein the training data required for training the models were previously uploaded on the respective storages. For example, a collection of images and/or sound recordings including each feature, and annotated accordingly, can be uploaded to the content server 11 via a client device 12 for the express purpose of training the learning models—for example, by uploading representative images or videos of AFL players annotated accordingly. In another example, a user can upload their own created primary content and provide an indication of features expected to be present—this can be particularly useful in cases of the features being entities such as players. In this example, the user can be prompted to provide such annotation information in the event that the content server 11 does not identify the features desired by the user (e.g. the user can provide "corrections" to the content server 11 which act as annotations, which can improve the feature identification module 27 for future analyses of primary content). Therefore, the content server 11 obtains annotated training data as either already annotated or annotated upon prompt for input made to the user.

Both the accuracy and effectiveness of the respective models can be improved as additional images and/or sound recordings are made available through the normal operation of system 10, e.g. as new primary content is uploaded to the content server 11, the primary content or portions thereof can be used by the feature identification module 27 to identify the respective features. For example, for identifying a particular person's face, it is desired that images of the person's face captured from several different angles be gathered. Further, over time, as different primary content can be analysed to identify a same feature, additional images and/or sound recordings can be collected, stored in the respective feature information database and used by the feature identification module 27. Therefore, uploaded primary content can be utilised for further training of the models, thereby improving the feature identification process over time. In an implementation, a user can be prompted to identifying the presence of one or more features in the primary content (in a video, the user can also be prompted to designate a position within the video in which the feature is present). For example, a user can be prompted for such information if the feature identification module 27 fails to identify a feature of interest to the user, which the user has previously indicated (e.g. via a search input) is present within the primary content.

Each learning model can then be trained using images and/or recordings previously collected and stored in the data storage 21 for the respective feature, as well as images and/or recordings additionally collected from the internet and/or hardware storage on the client device 12. As a result, advantageously, the accuracy and effectiveness of the respective learning models can improve over time.

Referring back to FIG. 2, content server 11 is arranged to process each content segment of a particular piece of primary content in order to extract, for each instance of an identified feature ("feature instance"), time data elements defining a position within the primary content at or around which the identified feature occurs in the content segment, at step 103. A feature instance is a particular instance within the primary content in which a particular feature appears—for example, an instance at which a particular player appears (as an entity feature) or an instance in which a smile appears. Therefore, the same feature can be present one or more times as distinct feature instances. The data storage 21 includes a feature storage 28 for storing information in relation to feature instances. It should be noted that the feature storage 28 is shown and described as a separate logical component of the data storage 21 for ease of disclosure and is not intended to be limiting.

The time data elements will generally be referred to herein as "timestamps", although other means of representing the time data elements can be substituted. For each identified feature instance, the content server 11 is arranged to extract at least one timestamp associated with the location of the feature instance within its associated primary content. For example, a first timestamp defining a position in the primary content being certain amount of time before the time at which the identified feature instance occurs and to a second timestamp defining a position in the primary content being a certain amount of time after the time at which the identified feature instance occurs. For each identified feature instance, timestamps are extracted such that each identified feature instance is associated with a set of timestamps (the set comprising one or more timestamps, depending on the implementation). Therefore, the content server 11 is enabled to identify, for a particular feature instance, both a piece of primary content and a location within the primary content by reference to the set of timestamps associated with the particular feature instance. Reference herein to a particular "feature instance" should be understood as equivalent to a reference to the location and primary content in which the appearance occurs.

Analysis of all content segments associated with a piece of primary content therefore results in the extraction of a set of timestamps for each feature instance identified. In an embodiment, the collection of one or more sets of timestamps is stored in the feature storage 28, at step 104. The feature storage 28 is configured to enable searching of features and therefore is arranged to store information identifying the features instances identified within a particular piece of primary content. The feature storage 28 can be understood, in an embodiment, to comprise a feature database having entries associating a feature with one or more sets of timestamps (each of which can comprise one or more timestamps depending on the implementation) and a piece of primary content (e.g. as a primary content identifier)—therefore, a combination of primary content identifier, feature, and a specific one of the sets of timestamps essentially identifies the feature instance (i.e. which multimedia content comprises the feature, what type of feature, and where it is found in the identified primary content).

For example, for features A, B, C, respective one or more sets of timestamps $\{T_A\}$, $\{T_B\}$, $\{T_C\}$ are extracted and stored in the feature storage 28. The stored sets of timestamps thus remain available for other users/client devices 12 to use when the features to be identified correspond to those already used for the same primary content. As a result, there is advantageously no need for the content server 11 to scan the primary content again for feature identification unless explicit instructions are received to re-analyse the primary content for identifying the same features A, B, C and/or new one or more features. In this event, new extracted set(s) of timestamps, if different from the sets of timestamps previously extracted, will be added to the feature storage 28.

In an embodiment, other information can be stored in relation to particular feature instances. For example, if the primary content is associated with a sports game, then information regarding that game can be provided (date, teams involved, result, etc.). Such information is referred to as auxiliary metadata herein and can be provided via user input by either the user uploading the primary content or subsequently by another user with suitable access rights to make changes and additions to the auxiliary metadata. In an embodiment, the auxiliary data is stored in an auxiliary metadata storage 29, as shown in FIG. 1—it should be noted that the auxiliary metadata storage 29 is shown and described as a separate logical component of the data storage 21 for ease of disclosure and is not intended to be limiting.

As a result of steps 100-104 of FIG. 2, an uploaded piece of primary content is processed and has stored information identifying, for the particular piece of primary content, features of interest identified within the primary content and the times at which particular instances of these features are present (the feature instances).

Figure 3:
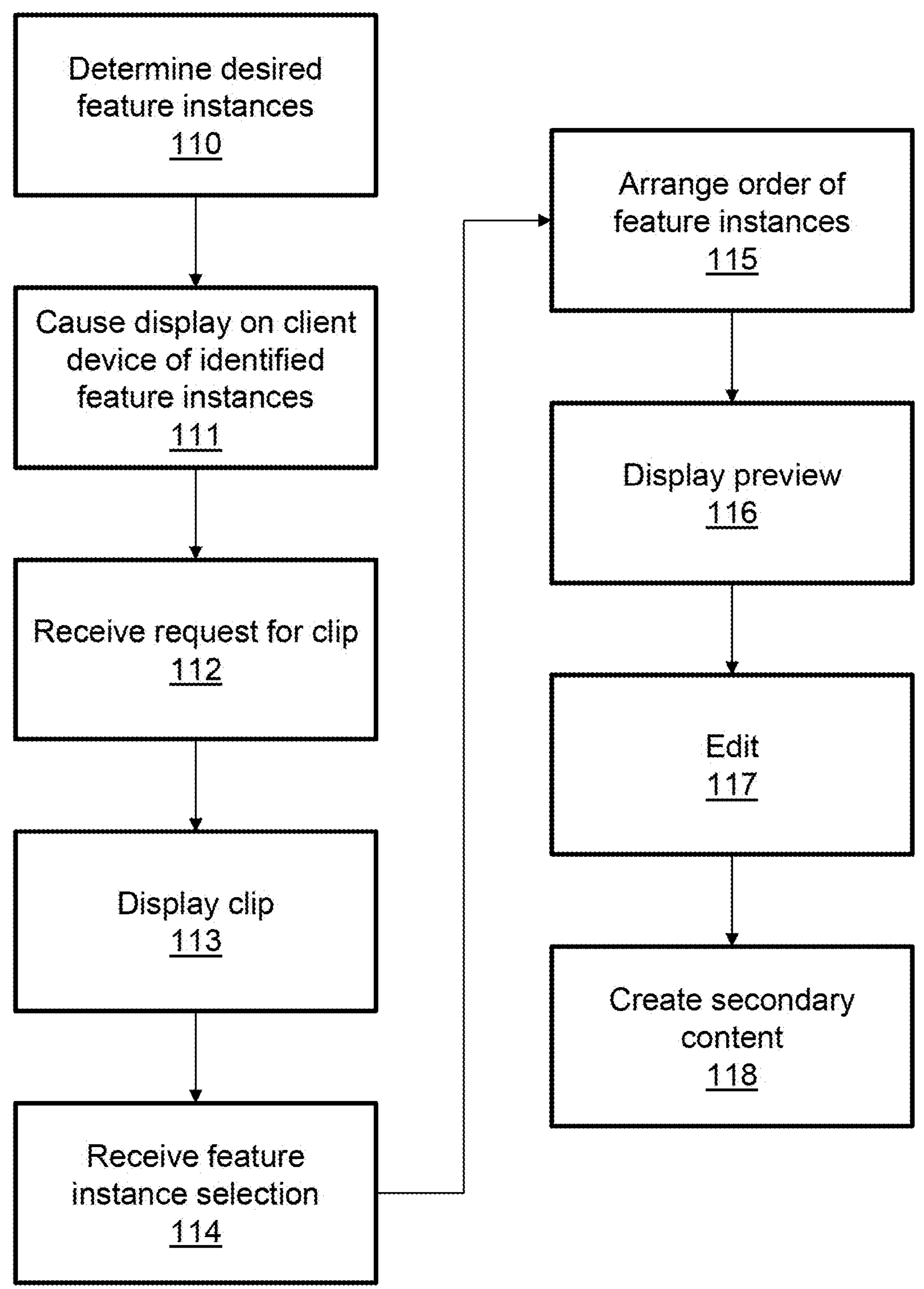
FIG. 3 shows a method for secondary content creation based on primary multimedia.

FIG. 3 shows a method for secondary content creation based on primary multimedia uploaded and processed according to the method of FIG. 2, according to an embodiment. This method can be implemented by a content generation module 23. In this case, the secondary content is created based on a single piece of primary content. For example, a user uploads a particular piece of primary content which is processed according to the method of FIG. 2, and then made available to the user (via their client device 12) for secondary content creation. Secondary content is that created from primary content, but not typically equivalent to the primary content.

At step 110, the content server 11 identifies one or more feature instances to make available to the user, typically related to one or more desired features which can be specified by the user. In an implementation, one or more desired features can be predetermined—for example, by a content owner.

In an embodiment, the desired feature instances can be those entered as a search term by the user as described with respect to a particular embodiment of FIG. 2—that is, the analysis undertaken by step 102 can based on an input set of features which is also utilised in determining the set of desired feature instances. It should be understood that step 110 can be performed, in essence, automatically in this embodiment as a result of the search terms entered by the user (i.e. step 104 automatically progresses to step 110). In an embodiment, which can be combined with the previous embodiment or in implemented in the alternative, the content server 11 requests from the user (via their client device 11) an input of desired feature(s). For example, this can be applicable where certain features are automatically identified irrespective of any user input in relation to step 102, and therefore, the user is required to indicate particular features. In either case, the set of desired feature instances can be defined by desired features. For example, the user can desire to identify each instance at which a particular player appears within the primary content, the feature being the particular player and the feature instance(s) being each appearance of the player.

At step 111, the content server 11 communicates with the client device 12 of the user to cause a display (typically visual via a GUI) of information corresponding to the identified feature instances.

Figure 4A:
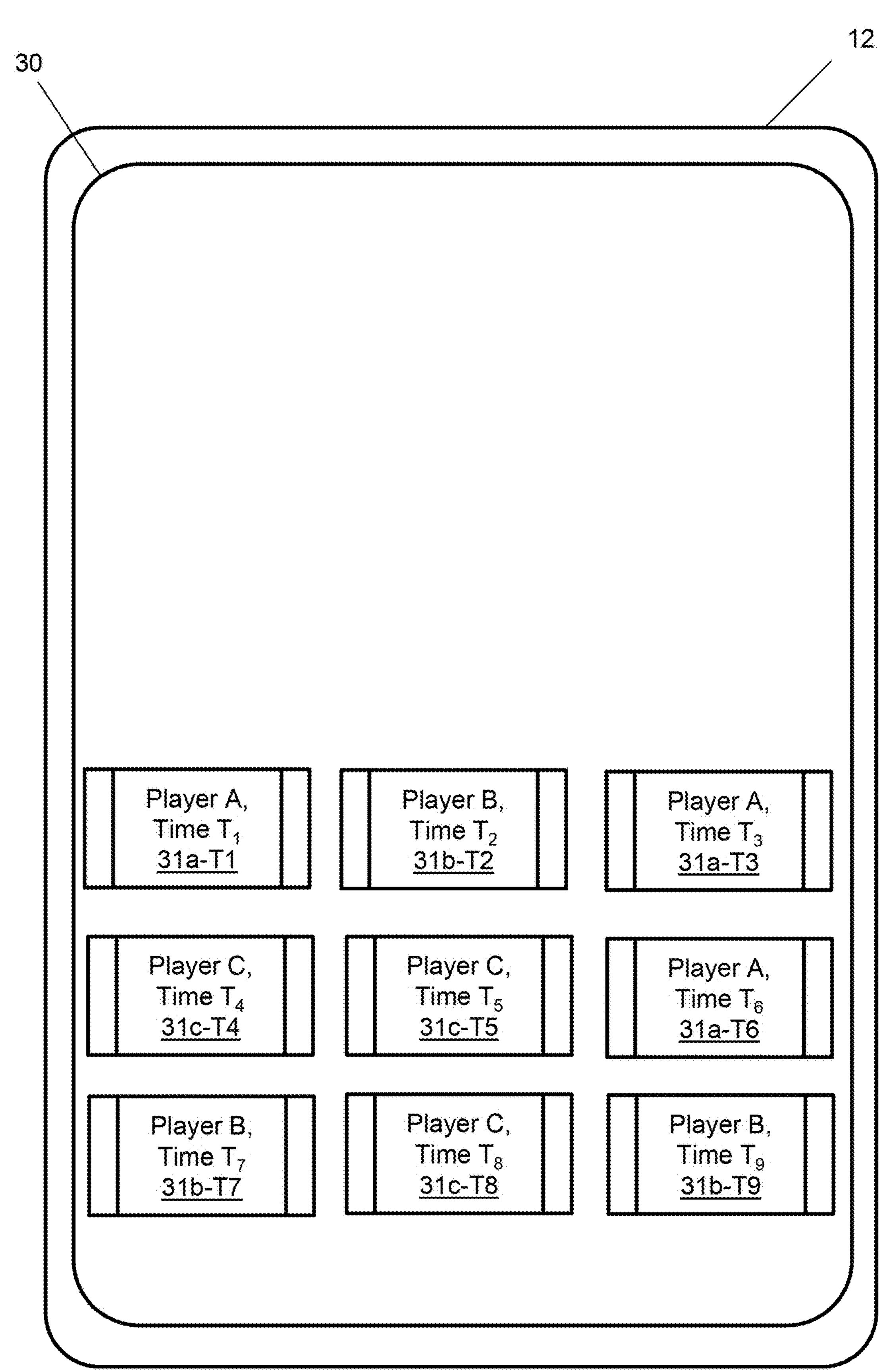
FIGS. 4A-4F show representative displays for enabling secondary content creation by a user.

FIG. 4A shows an example display 30 of icons 31 representing each feature instance. Here, there are three different icon types represented by icons 31*a*, 31*b*, and 31*c*, where each icon 31*a*, 31*b*, 31*c* is associated with a particular feature—in this case, the features are Player A, Player B, and Player C (respectively). Different display types are anticipated, for example, where a large number of icons 31 are required (due to a large number of identified feature instances), multiple pages of icons 31 can be made available requiring scrolling or a similar action to completely peruse. The icons 31 also represent the time at which the associate feature instance is located (indicated by $T_i$ where i represents a particular time)—a particular icon 31 is referenced herein according to its type (lowercase letter suffix) and its relative position within the piece of primary content (Ti suffix, where i is a number indicating the relative position). The icons 31 in this implementation are ordered according to time, such that the user is aware of the relatively positions within the primary content of each feature instance—typically, the times will be displayed on the display 30. The figure is intended to be exemplary; the number and/or ordering of icons 31 can be variable and/or predetermined.

Referring back to FIG. 3, at step 112, the content server 11 receives a request for display of a media portion (herein equivalent to clip 32) associated with a particular feature instance. The clip 32 is determined based on the at least one timestamp associated with the feature instance; therefore, the clip 32 is determined with reference to the feature storage 28. For example, a clip 32 can be identified based on a first timestamp being one second before the identified feature instance occurs within the corresponding piece of primary content and to extract a second timestamp occurring after a certain amount of time (which can be predefined) after the identified feature instance occurs, the range between the first timestamp and the second timestamp defines the clip 32. In another example, a single timestamp defining the location within the primary content is utilised, with a predetermined time before and after the timestamp location defining the extent of the clip 32. A particular clip 32 can therefore be understood as associated with a particular icon 31 and, similarly, a particular feature instance with the clip 32 representing the portion of the primary content associated with the feature instance and the corresponding icon 31 representing a selectable representation of the feature instance on a client device 12.

In an embodiment, clips 32 are created during the processing according to FIG. 2 and stored in data storage 21. These clips 32 are therefore immediately available through being stored in the data storage 21 (e.g. within multimedia content storage 26 separately to the stored primary content). Advantageously, this arrangement can minimise processing time during the implementation of the method of FIG. 3. In an embodiment, clips 32 are created "on-demand", that is, in response to the request received at step 112. This embodiment can be advantageous in that ongoing data storage demands can be reduced. In an embodiment, a clip 32 is cached in memory after creation, although it can be removed from cache after a certain time or in response to determining that the client device 12 is no longer in communication with the content server 11. In one embodiment, the content server 11 is arranged to generate clip "previews" having a predetermined duration and in one specific example, can be 5-second clip previews, for example corresponding to the first 5 seconds of the corresponding clip 32. Here, the clips 32 themselves are not necessarily created at this point, and instead, the clip previews are sourced from the primary content, for example, where the content server 11 is arranged to "jump" to the corresponding timestamps of the primary content and thereby directly stream from the primary content. In an embodiment, a clip 32 is requested via the user interacting with the associated icon 31, for example, by clicking or pressing on the icon, or "hovering" a mouse over the icon 31. In an embodiment, a clip 32 or clip preview corresponds to the particular content segment associated with the feature instance (e.g. where the feature instance first appears in the primary content).

Figure 4B:
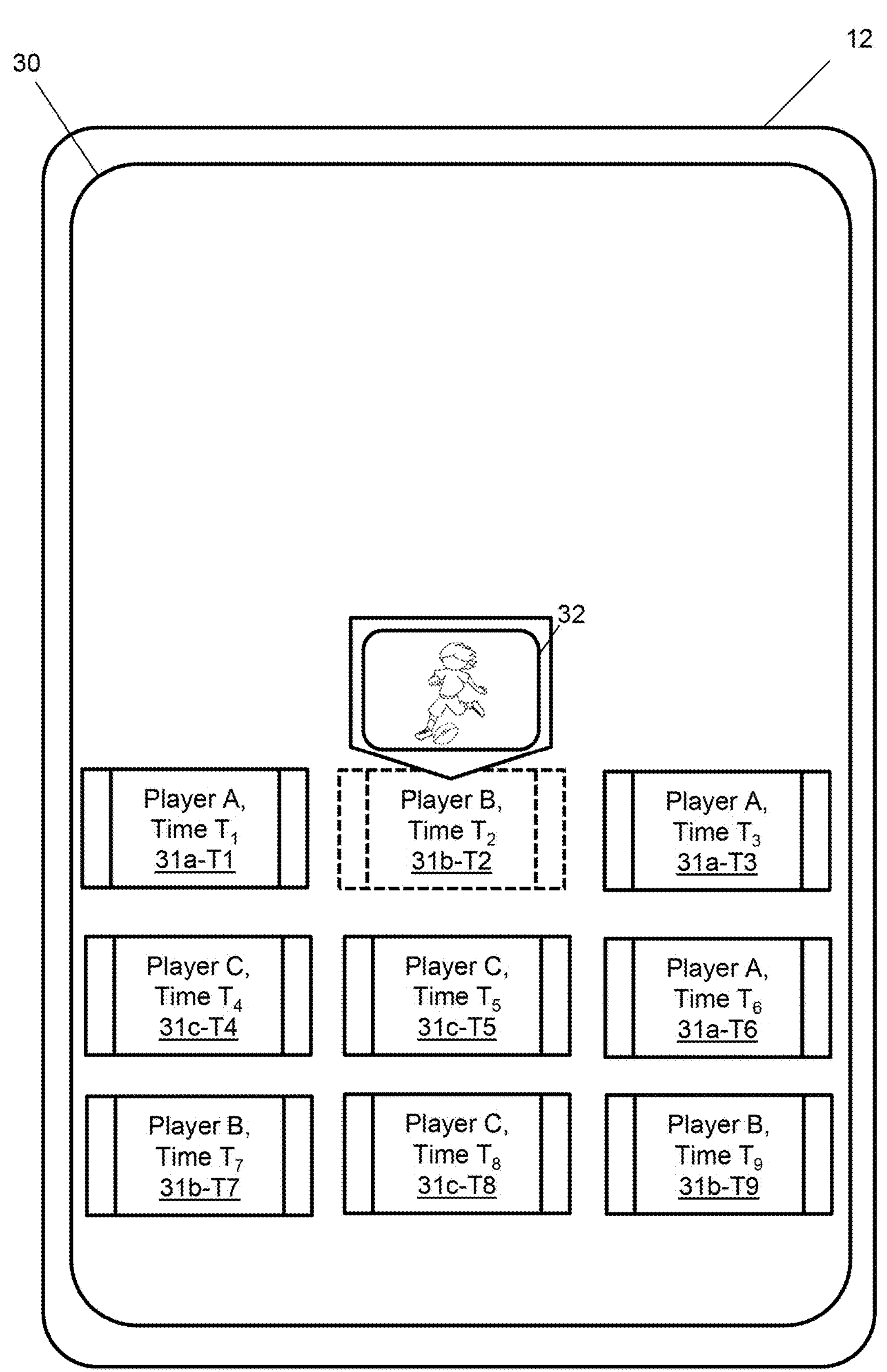

At step 113, the clip 32 is display to the user via the display 30 on the client device 12. FIG. 4B shows an example of a "pop-up" video displaying a clip 32 associated with a particular icon 31*b*-T2 (indicated by dotted lines). Therefore, the user is presented with a preview of the content associated with the particular selected feature instance.

Referring back to FIG. 3, a selection of one or more feature instances from client device 12 is received at step 114; in this case, via a user action of selection the corresponding one or more icons 31 for example clicking or pressing respective icons 31. The selection constitutes a selection to include the related clip 32 for each feature instance in the secondary content intended for creation. At step 115, the user can arrange the order of selected feature instances with respect to one another.

Figure 4C:
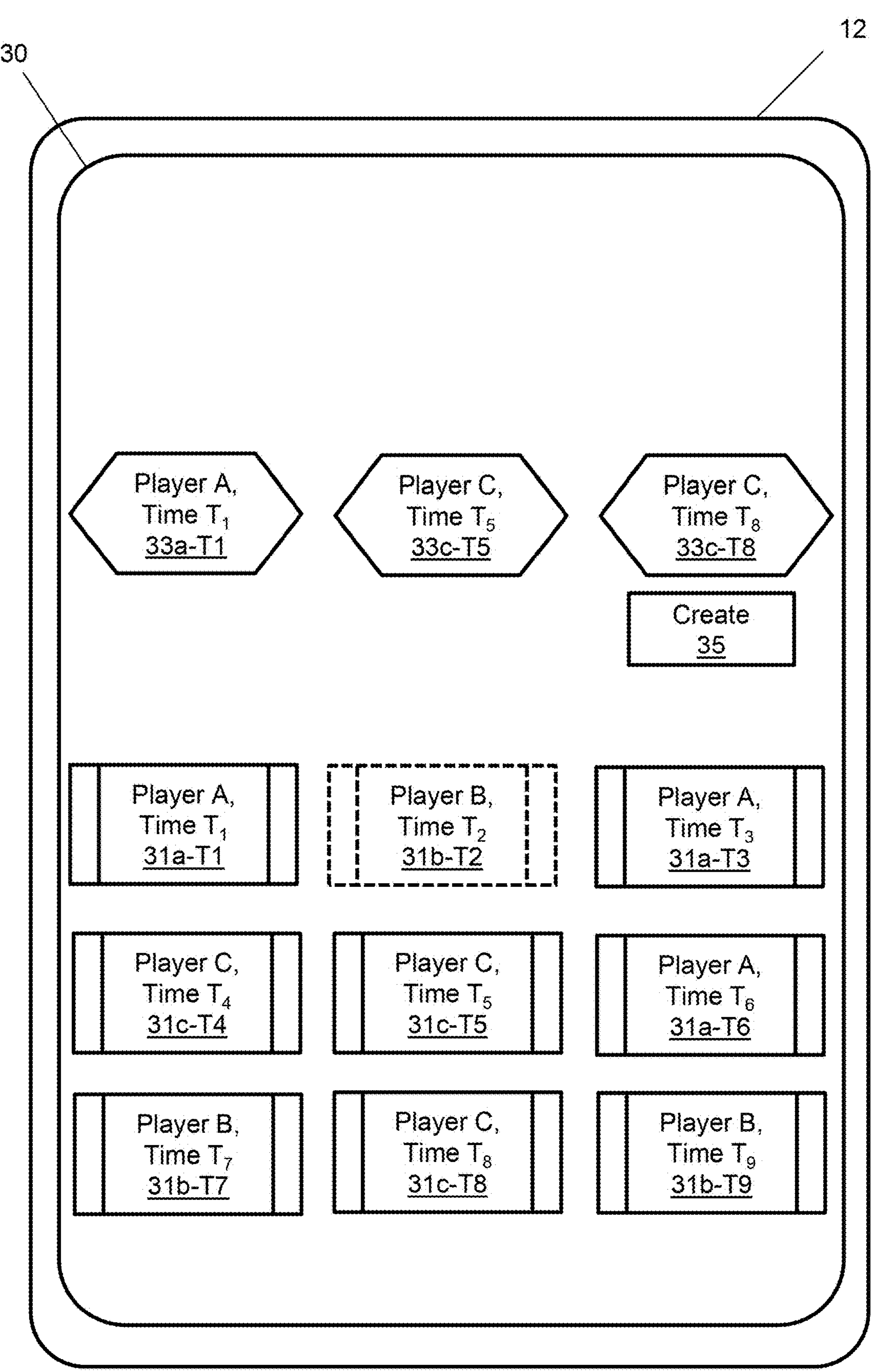

FIG. 4C shows an example whereby a user has selected three feature instances corresponding to the three shaded icons 31*a*-T1, 31*c*-T5, and 31*c*-T8. In this example, the selection is also represented by corresponding selected icons 33 (using the same approach to suffixes, thus shown are selected icons 33*a*-T1, 33*c*-T5, and 33*c*-T8) being represented above the displayed icons 31. The client device 12 is configured to allow the user to arrange the order of the selected icons 33, which will affect the ultimately created secondary content. For example, by clicking or pressing on a selected icon 33 and moving it to another relative location (often referred to as dragging the selected icon 33) with respect to the other selected icons 33. In an implementation, a user can select particular feature instances by dragging the respective icons 31 into a suitable portion of display 30 (e.g. the region above the icons 31 in which selected icons 33 are shown present in FIG. 4C, referred to as a "selection region"). In this implementation, the user can both select and order a feature instance via dragging its associated icon 31 to a relative position with respect to already selected feature instances (i.e. already present selected icons 33).

At step 116, a preview 34 is provided to allow the user to view the result of the combination of selected feature instances and the selected order, the preview corresponding to a presentation of portions of the primary content. The preview 34 can simply correspond to playing each of the corresponding clips 32 of the selected feature instances in the desired order (or, optionally, clip previews associated with the clips 32).

Figure 4D:
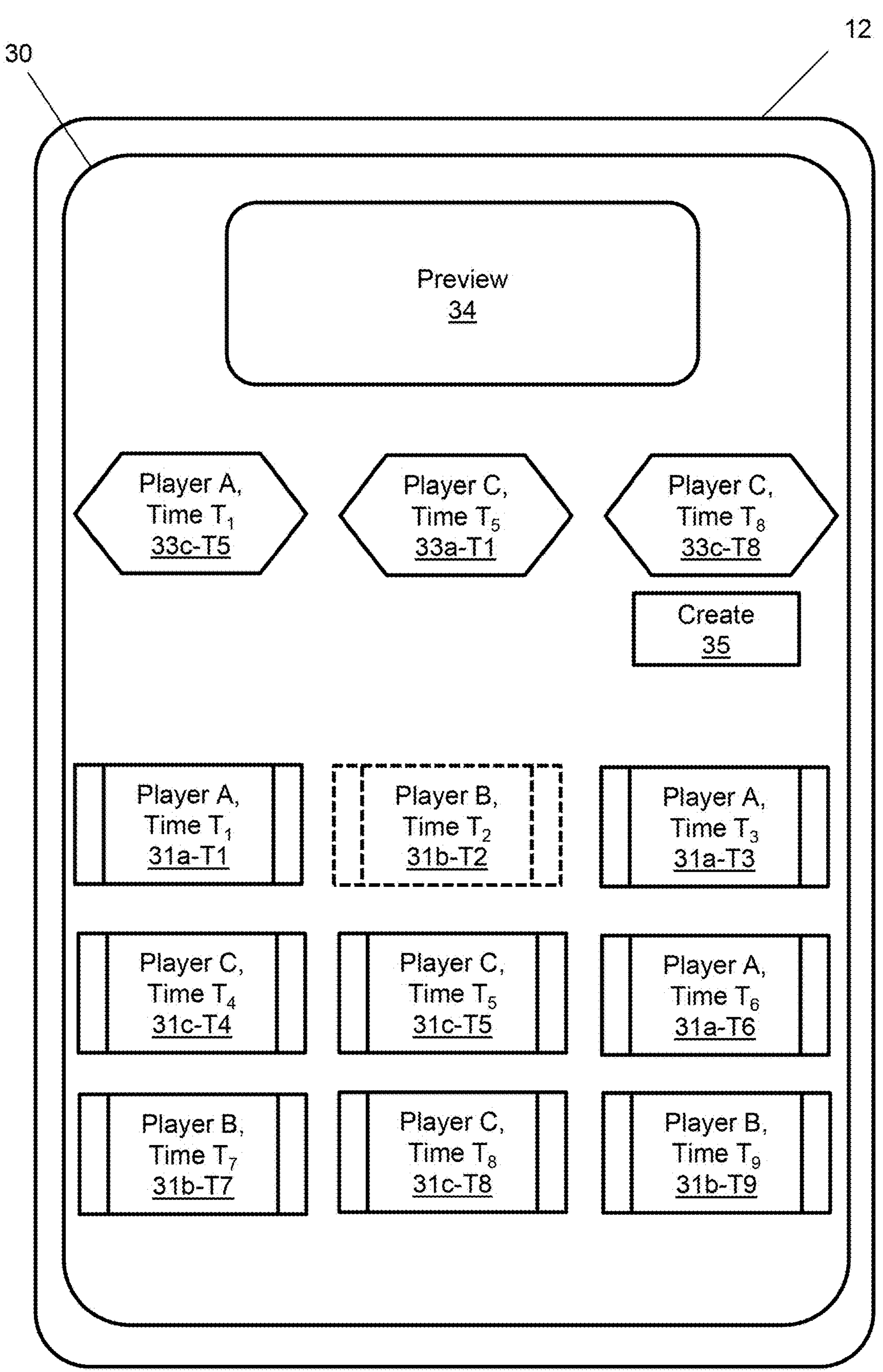

FIG. 4D shows an example showing the preview 34 as a window on the display 30. Note that the ordering of selected icons 33*a*-T1, 33*c*-T5, 33*c*-T8 is different to FIG. 4C as a result of user action to change the order. In this case, the preview will show the clips 32 associated with icons 33*a*-T1,

33*c*-T5, 33*c*-T8 in the order shown, namely, in order of selected icons 33*c*-T5, 33*a*-T1 and 33*c*-T8.

It should be noted that steps 112 and 113 can be optional. It should also be noted that steps 113-115 can be repeated with arbitrary order. For example, the user can select one or more feature instances (i.e. step 114), then obtain a clip 32 of yet another feature instance (i.e. steps 112 and 113), then add or remove feature instances from selection. The display 30 updates to reflect the newly selected icons 33 and to reflect deselection of icons 31. The display 30 can display a clip 32 (step 113) while also displaying selected icons 33 and preview 34. The display 30 can also display changes to the ordering of selected icons 33 (step 115) at any time.

The user then instructs the content server 11 to create the secondary content defined by the ordering of selected feature instances, at step 116. This can be actioned via a user input via client device 12, for example, by selecting the "create" button 35 shown in FIGS. 4C and 4D. Of course, the user is free to cancel secondary content creation instead.

Optionally, the user can be offered an opportunity to edit the secondary content before it is created, at step 117. The editing can be based on clips 32 associated with the selected feature instances. As the clips 32 can have a limited extent (e.g. limited to a certain time before and/or after the corresponding feature instance appears in the primary content), functionality can be provided to allow the user to extend or shrink the clips 32 which can require regenerating the relevant clips 32 from the associated primary content. This can be achieved as per the methods described herein, however, the relevant start and end point of the clip 32 is calculated according to the user request, as opposed to a predefined technique.

The content server 11 then creates the secondary content, at step 118. It should be noted that if there is overlap in consecutive clips 32 associated with selected feature instances, then the content server 11 can merge the relevant clips 32 into one continuous clip 32, to avoid portions of the primary content being repeated for adjacent clips 32. Overlap here means that two or more consecutive clips 32 share a portion of the primary content. In an embodiment, this is a user selectable option. In another embodiment, the system 10 is preconfigured to combine overlapping consecutive clips 32 or to prompt a user to agree with a merger.

These embodiments may provide an advantage in that computational resources requirements are reduced in the process of create new media (e.g. secondary content) by extracting portions of media from the primary content. Rather, only short extracts of the primary content at the extracted time data elements are streamed and displayed on the graphical user interface of the client device 12 the content server 11 "jumps" to the corresponding timestamps in the primary content or to pre-stored or cached clips 32 associated with specific feature instances. The advantage can reduce the total time between a user requesting to view a clip 32 and being provided with the clip 32.

In an embodiment, the user can further select the same feature instance (e.g. via the client device 12 through, for example, multiple selections of a particular icon 31) as many times as desired, thereby enabling the user to arrange for the same feature instance to be shown repeatedly at different relatively locations with the resulting secondary content. For example, in an implementation, a user is enabled to "drag" a particular icon 31 to the selection region above the icons 31 several times (or otherwise select a particular icon 31 several times), and each time, a new selected icon 33 is created and presented within the selection region.

In an embodiment, the content server 11 is arranged to automatically select one or more feature instances rather than receive a user input (or at least, in addition to any feature instances selected by the user), and to display to a user a preview of the selected feature instances wherein the user, if satisfied with the automatic selection, can enter an input to proceed to step 117 or 118.

In an embodiment, the content server 11 is arranged to automatically select one or more feature instances based on previously selected feature instances by a user (which can be the same or a different user) from the same primary content. As mentioned above, stored timestamps defining various feature instances remain available, in an embodiment, for other users/client devices 12 to use when the features to be identified correspond to those already used for the same primary content. If the same primary content is reanalysed to identify either the same or a different set of features, new extracted timestamps that are different from the timestamps initially extracted are added to the data storage 21.

Figure 4E:
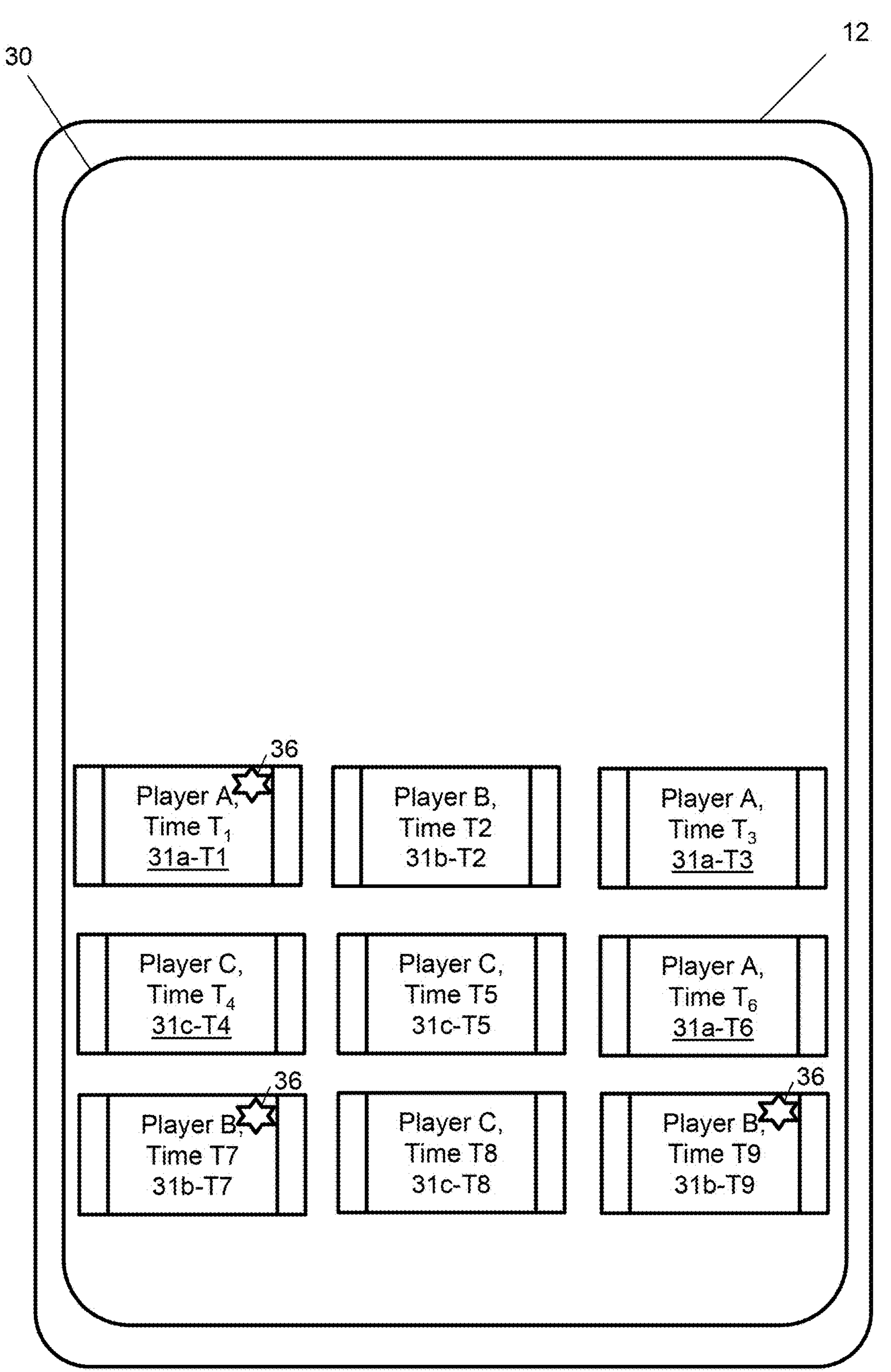
Figure 4F:
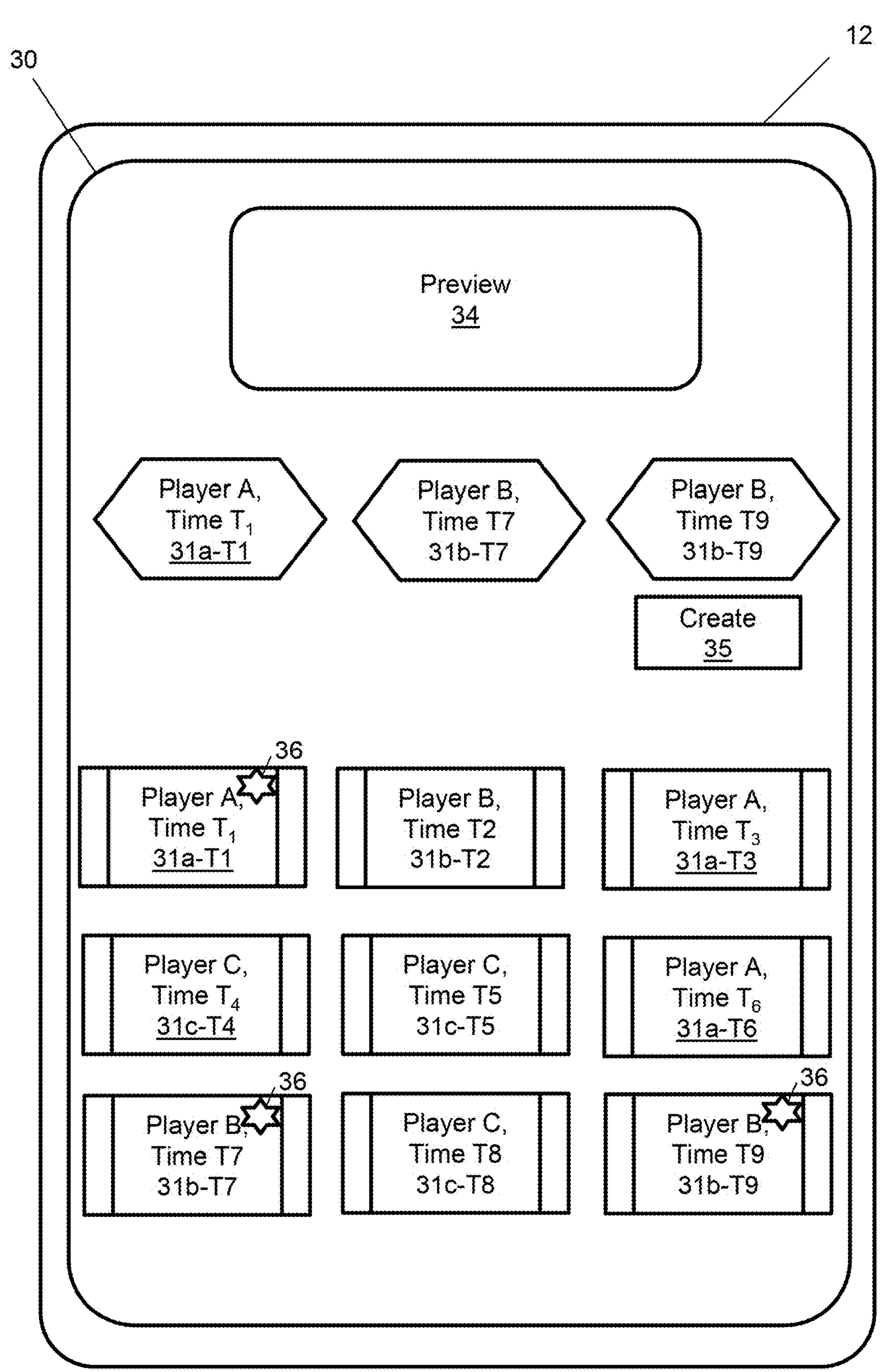

Further, in an embodiment, once a user has selected the sequences of clips 32 in a given order, the content server 11 is arranged to record (for example, in the feature instance database) information indicating that the particular feature instances have been selected for secondary content creation. Therefore, the system 10 can monitor popularity of particular feature instances and make recommendations to subsequent users based on, at least in part, the popularity of particular feature instances (e.g. the relative number of times those feature instances have been selected). That is, advantageously, prior selections by other users can be utilised to provide suggestion to a current user, thereby reducing the burden on the user to select particular timestamps (and thereby the clips 32 associated with said timestamps). In this way, effectively, more "popular" clips 32 can be automatically suggested to a user. For example, referring to FIG. 4E which is a modification to FIG. 4A, the top three most popular feature instances of those returned according to the user's search query are marked with stars 36 to indicate to the user the popularity of those feature instances. In fact, these marked icons 31 can be initially selected—for example, as shown in FIG. 4F.

An advantage of this embodiment can also be that content owners (e.g. as described below) can be informed of particularly popular clips 32, the popularity of which can otherwise take time to become apparent. That is, although a content owner can monitor social media and the like to identify popular clips 32, the present embodiment generates such information directly from the number of users selecting particular clips 32 (that is, at generation of user created content, not later after it has been present on the Internet for a period of time).

In an embodiment, the secondary content itself (e.g. as a separate media file) is not stored as such in data storage 21, or at least, is only temporarily stored. Instead, it is effectively stored in the form of secondary content metadata defining, in effect, the location of each selected feature instance (or associated clip 32) in the primary content and the order in which the clips 32 should be reconstructed. Therefore, in effect, in each instance in which the secondary content is to be viewed, it is constructed "on-demand" according to the secondary content metadata. The content server 11 therefore stores the secondary content metadata (e.g. in secondary content storage 25) identifying relevant locations in the primary content (which, as described, can correspond to individual content segments) for example by storing the timestamps identifying the clips 32 (whether modified by step 117 or not), and the order in which the clips 32 are to be presented. In effect, the secondary content metadata defines the inclusion of particular feature instances in the secondary content and their ordering. Therefore, the secondary content is effectively created and streamed to a client device 12 on-demand—that secondary content is not stored in a permanent memory. It is anticipated that secondary content generated on-demand in this manner can be cached, in certain embodiments, for a period of time to enable access to the secondary content already created on demand to further requests for said secondary content for a limited time. For example, the content server 11 can have access to a temporary storage memory of limited size, and secondary multimedia is cacheable but removable based on system 10 requirements—for example, if secondary content is not accessed for some time and new and different secondary content is created since a last access, then the older secondary content can be removed to provide room for the newer content. This can advantageously reduce processing demands for "popular" secondary content—that is, secondary content for which a large number of requests are made.

Advantageously, such an arrangement may allow for improved memory usage because secondary content is not being permanently stored in response to user commands. Such an embodiment can be beneficial where it is anticipated that large numbers of users will create secondary content from a smaller pool of primary content—the described embodiment advantageously avoids or reduces unnecessarily reproducing the same content over multiple files.

In an embodiment, upon input from the user of a selection of a piece secondary content (which can, depending on the embodiment, be defined with reference to secondary content metadata) to:

i) extract from the primary content, and using a multimedia handling software program (such as FFmpeg software), temporary clips 32 for each content instance (which can, as discussed, be defined according to one or more timestamps referencing particular primary content);

ii) convert each individual extracted content segment or a defined portion thereof into an ".MP4" file;

iii) arrange, using the multimedia handling software program, the converted ".MP4" files in the order selected by the user; and iv) combine the ordered converted files, whereby the secondary content is generated.

Once the secondary content is generated, the temporarily extracted clips 32 can be deleted from the system 10 so that they no longer take up storage space in the data storage 21. In an embodiment, the generated secondary content can optionally be stored in the data storage 21 in certain cases. For example, certain users can have additional rights to store secondary content (for example, up to a certain total storage amount)—for example, the system 10 operator can offer a "premium" membership with a corresponding fee payable, said premium membership having a certain amount of storage.

Figure 5A:
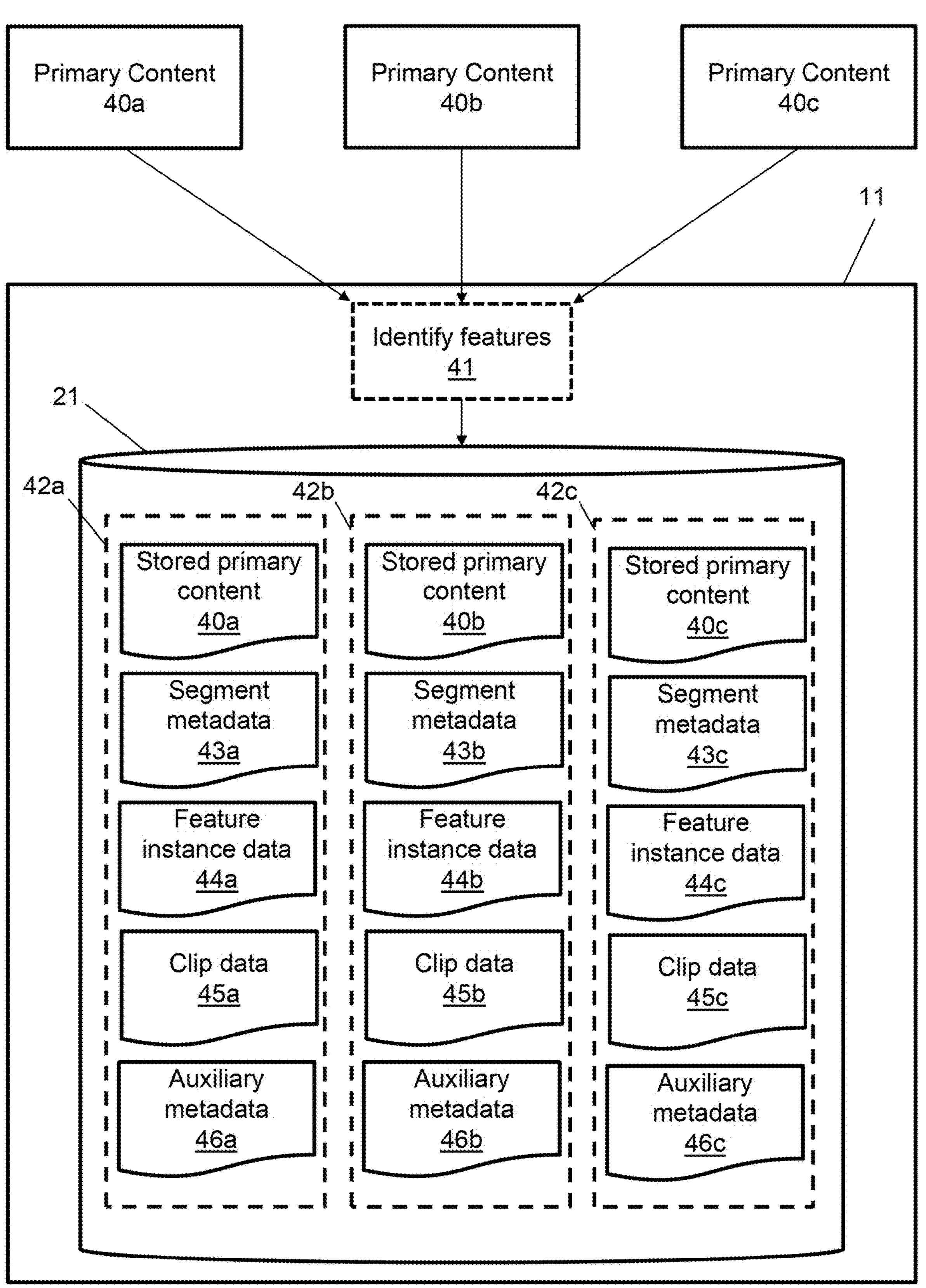
FIGS. 5A and 5B show an embodiment in which secondary content is creatable from multiple pieces of primary content.
Figure 5B:
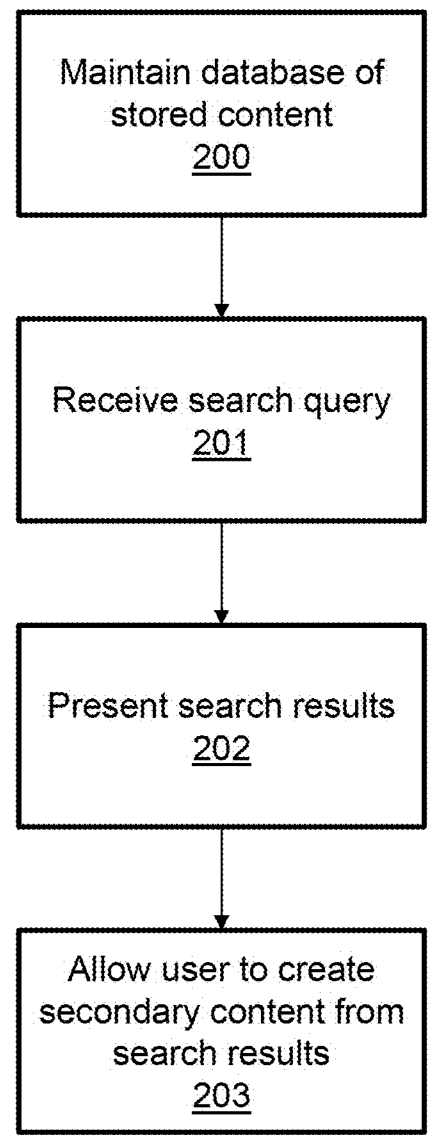

Referring to FIGS. 5A and 5B, the methods described with reference to FIGS. 2 and 3 can be extended to allow access by a user to previously uploaded primary content. This previously uploaded primary content can be by the same user and/or other users. In one embodiment, users can control access to content uploaded by themselves to other users. Furthermore, certain users referred to as "content owners" can control access to primary content for which they have a legal control over (e.g. primary content including video of a particular sports team, Team A, can be controlled by a content owner of Team A).

FIG. 5A shows several instances of primary content 40 being uploaded (or otherwise provided) to the content server 11, each of which is shown being processed by content server 11 for feature instance identification 41 and then stored in the data storage 21. Relevantly, the figure shows that the stored content 42 comprises the primary content 40 (either as a unitary file or as content segments, and which can be stored in multimedia content storage 26), segment metadata 43 linking the primary content and resulting content segments, feature instance data 44 (e.g. stored in feature storage 28) identifying the locations of each identified feature instance within the primary content, and optional clip data 45 corresponding to extracted clips 32 from the primary content or clip metadata defining the creation of the clips 32 from the clip metadata. In a variation, the extracted clips 32 are stored in lieu of the primary content/content segments, as the system 10 can instead provide access specifically to extracted clips 32 rather than the primary content. Also shown is auxiliary metadata 46 (e.g. stored in auxiliary metadata storage 29), which although optional, can provide for improved searching for content.

FIG. 5B relates to a method for allowing a user to access multiple instances of primary content, and to create secondary content from clips 32 obtained from each.

At step 200, the content server 11 maintains a database of stored content 42 having suitable feature metadata for identifying features and feature instances within various pieces of primary content.

At step 201, a user enters a search query for primary content, via a suitable interface on the user's client device 12. It is expected that, from a user perspective, the search relates, at least in part, to a search for particular one or more features, while the result includes, in effect, the identification of one or more pieces of primary content comprising said feature(s). Various different search options are anticipated, and those provided can depend on the particular implementation. Generally, the results of the search query can include reference to one or more pieces of primary content and reference to particular feature instances within the primary content (the result can instead refer to particular features, however, it is expected that identification of feature instances will be more suitable for the results). For example, if a user searches for a particular player, Player A, the search results can include primary content which includes Player A (which is determinable from the feature instance data 44).

It is expected that the user can limit the range of primary content for which a search is made. For example, by reference to the auxiliary metadata stored with the primary content 40. In one sports example, the auxiliary metadata includes game identification (e.g. by reference to a particular round of a competition and/or by reference to a particular game within that round) or particular team information (e.g. all games involving a particular team). In this case, the search results will be limited to primary content related to the particular selected auxiliary metadata.

Additionally, or alternatively, the system 10 can be configured to limit the results (again, possibly with reference to auxiliary metadata). For example, in a case where a user is accessing a sub-system 60 of a particular content owner, the search results can be limited to those authorised by the content owner (see below for disclosure of such sub-systems 60). Various other combinations of limitations are expected, some of which can be understood as user controlled and others being restrictions imposed on the user by the system 10.

One restriction that can be advantageous is to limit search results to either user-generated content or content owner-generated content. In essence, this can be the difference between "unofficial" and "official" content, respectively.

The search results are then presented to the user at step 202. The search results can be ordered, in which case, the ordering is dependent on the implementation. For example, a scoring algorithm can be utilised as is known in the art. A certain number of official primary content can be required at or near the beginning of the search results—that is, content that is uploaded or otherwise controlled by a content owner. The search results can be displayed as individual feature instances rather than in terms of the originating primary content—therefore, the focus for the user can advantageously be on the feature instances (or associated clips 32), rather than the origin of the content. Step 202 can therefore be considered, in certain embodiments, to be equivalent to step 111 of FIG. 3. In an embodiment, a scoring algorithm is utilised which, at least in part, accounts for a determined level of popularity of particular feature instances (e.g. how often said particular feature instances have been selected previously, by the same and/or different users, in creating secondary content).

The user can then select feature instances (or clips 32) and arrange and create secondary content, at step 203. This step can be understood is functionally equivalent to steps 112-118. A user can, however, undertake multiple searches while selecting feature instances or primary content from each search for secondary content creation. For example, selected icons 34 can be persistent between separate search instances.

Figure 6:
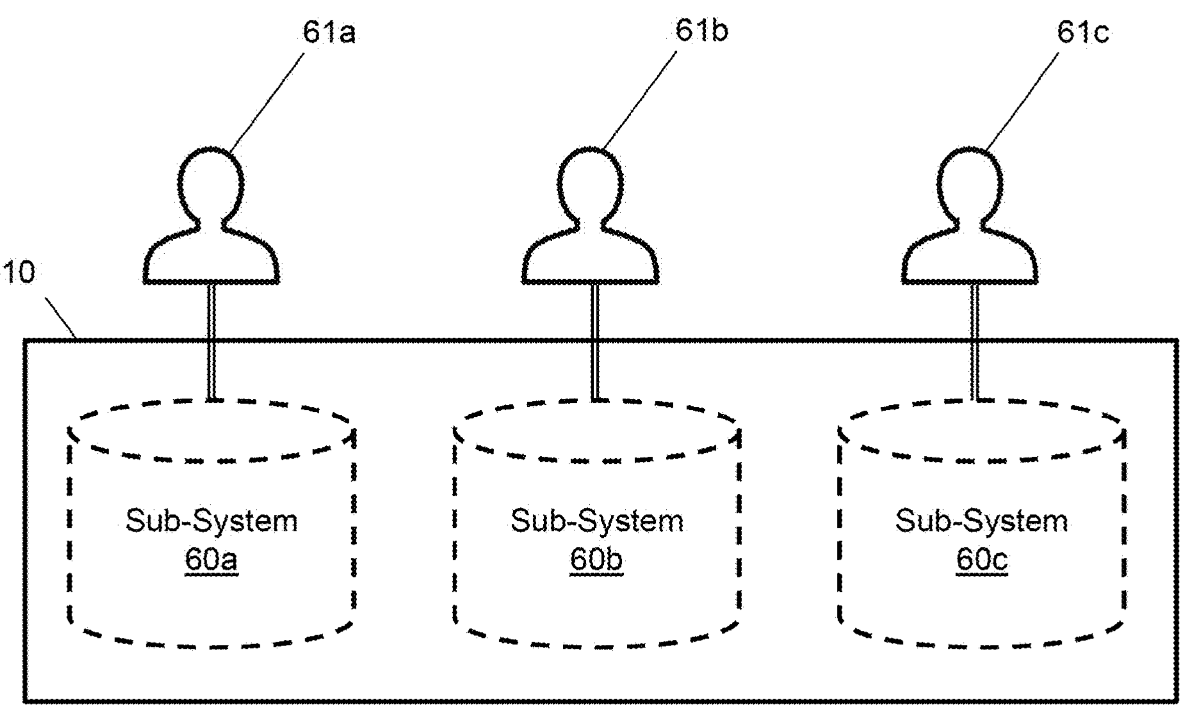
FIG. 6 shows a division of the system of FIG. 1 into multiple sub-systems associated with separate content owners.

According to an embodiment, with reference to FIG. 6, a further user type (herein, "content owner") is defined (the users described above may be considered "standard" users). It should be noted that the term "owner" is not intended to be limiting, although as will be apparent, the content owner has some level of control over the use of certain content items in the generation of secondary content within the context of system 10. To aide in disclosure of this embodiment, reference will be made to a specific sports team ("Team A") which is responsible for content involving its players or at least content that is in some way associated with Team A. Therefore, a content owner is associated with Team A and has access to the functionality of the system 10 relevant to this embodiment which is distinct from that of a user. Again, it should be understood that this is not intended to be limiting. There can be multiple users each being a content owner for a particular team, and these content owners can have varying levels of functionality (e.g. user rights) with respect to the system 10.

FIG. 6 shows a logical breakdown of system 10 into sub-systems 60A-60C (represented with broken lines) each associated with its own content owner 61A-61C. For example, these can correspond to Team A, Team B, and Team C respectively. In an implementation, access to each sub-system 60 by standard users is provided as a web plugin which can be implemented within a website managed by the corresponding team—this can be a so-called "white label" implementation which enables the corresponding team to associate its own branding with the sub-system 60. The term "white-label" should be understood as including "brand integration", in which a particular sub-system 60 is presented in a way associating it with both the content owner (e.g. a sports team) and the system 10 operator (e.g. a third-party service provider). However, the actual processing is managed by system 10 as a backend. In this way, each sub-system 60 can have access to various subsets of the primary content stored by the system 10. In particular, it is expected that each sub-system 60 will have access to the same primary content storage 26 although varying access to the actual primary content (e.g. according to usage rights associated with the content owners). In another implementation (which can be combined), a standard user is enabled to directly access system 10 via a web portal not necessarily associated with a particular content owner 61 (e.g. not directly through a particular team's website) although can be enabled to limit themselves to one, or a selection of, different content owners 61 (effectively, selected one or more teams).

In an implementation, a sub-system 60 is provided via a suitable functional interface such as via an application programming interface (API), software development kit (SDK), and/or iframe approach. Therefore, the content owner is enabled to include the sub-system 60 into its own web products (e.g. a website, or a specifically designed application which is often known as an "app" when implemented on a portable device running, for example, iOS™ by Apple™ or the Android™ operating system). Such an approach is advantageously convenient for the content owner as there is a relatively low implementation burden on the content owner. In terms of an API or SDK, the content owner can "add" the secondary content creation functionality to an owned product such as an app or website simply as an update to that app or website—the content owner is not required to create an entirely new product for access by its customers, which can advantageously facilitate distribution of the secondary content creation functionality.

The content owner 61*a*, 61*b*, 61*c* of a particular sub-system 60*a*, 60*b*, 60*c* is enabled to specify which primary content is accessible to standard users accessing the particular sub-system 60*a*, 60*b*, 60*c*. For example, a standard user accessing the system 10 via Team A's website does so by accessing sub-system 60*a* managed by content owner 61*a*. The particular sub-system 60*a* comprises sub-system rules defining the primary content to which the user has access, which is settable by the applicable content owner 61*a*.

In an embodiment, a content owner 61 is enabled to explicitly define the primary content to which a user will have access, for example, by providing an input for each primary content intended for availability with all other primary content considered unavailable (or, equivalently, by providing an input for each primary content not intended for availability with all other primary content considered available). Additionally, a content owner 61 can explicitly define portions of the primary content to which a user will have access, for example, by reference to specific timestamps within the primary content (which can be a range of timestamps).

In an embodiment, a content owner 61 is also, or alternatively, enabled to define formulaic rules to determine which content items (or portions thereof) are available. For example, via reference to specific metadata such as specific auxiliary metadata. For example, a content owner 61 can be enabled to specific a particular event, such as a particular game or games, by restricting users to primary content having auxiliary metadata indicating its relationship to the particular event.

In an embodiment, a content owner 61 is also, or alternatively, enabled to define a particular source of content items as allowable (or, equivalently, not allowable). For example, a content owner can 61 define that only content items sourced from (e.g. uploaded by) an authorised Team A representative are available to users.

It should be understood that a particular content owner 61 is typically limited to making available primary content for which it is responsible or to which it has been provided authorised access (e.g. to which it has suitable access rights)—e.g. this can include primary content uploaded by the content owner 61. A particular content owner 61 can selectively make primary content available to another content owner 61. For example, content owner 61*a* can upload a piece of primary content and make it available, via a suitable user interface instruction, to content owner 61*b* while not making said content available to content owner 61*c*). In a particular example, a content owner 61 (e.g. content owner 61*a*) can make primary content available to a class of other content owners 61, for example, those representing other teams within the same competition. Primary content can also be made available to other content owners 61 conditionally, for example, if content owner 61*a* uploads primary content related to a game between Team A (which it represents) and Team B (represented by content owner 61*b*), then content owner 61*a* can make it available to content owner 61*b*.

Advantageously, these embodiments allow a particular content owner 61 to control access to particular pieces of primary content by users (directly or indirectly via selectively making primary content available to other content owners), thereby enabling a level of oversight on the secondary content then created. This can advantageously assist, for example, with brand management by ensuring only "positive" (or at least, not negatively problematic) content is made available to users. However, users are themselves can advantageously be provided sufficiently flexibility in creating secondary content to "feel" engaged with the process, thereby facilitating positive engagement with the sub-system 60 which can have beneficial flow-on effects, for example, by facilitating positive engagement with the associated team's website and generally with the business of the team.

The control over access to primary content can be understood, in certain embodiments, as a search query limitation—that is, a limitation to the results that can be produced by a search query by a user. For example, a user accessing sub-system 60*a* can have its search query results limited to primary content authorised by the associated content owner 61*a*.

An advantage of the embodiment of FIG. 6 can be that a single system operator can manage system 10 while making its functionality available to a number of content owners 61 via associated sub-systems 60 in a manner that enables the content owners 61 control over the primary content available to users and, therefore, the resulting generation of secondary content. Therefore, content owners can advantageously provide (e.g. via a white-label approach) access to a content creation system (i.e. system 10) via an engagement with the system operator of system 10, rather than managing its own content creation system.

Figure 13:
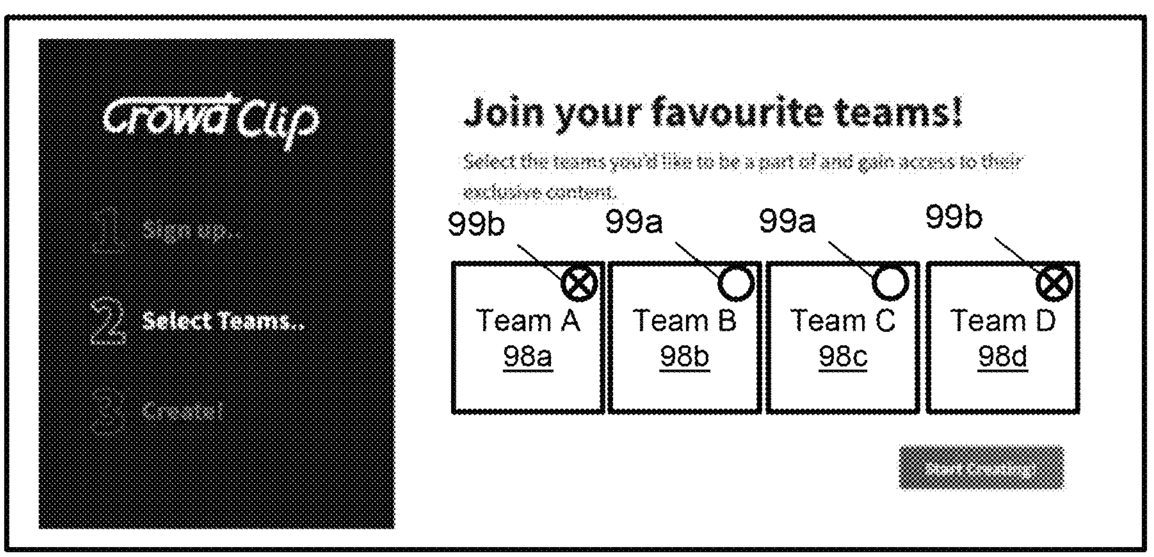
FIG. 13 shows a prompt for selecting particular sub-systems by a user, according to an embodiment.

FIG. 13 shows an example in which a user accessing system 10 via a client device 12 is enabled to specify, in effect, which sub-systems 60 the user is interested in joining. It is expected that such a prompt 97 is displayed when a user first accesses system 10 but can also be provided later in response to a user request. The prompt 97 lists several different teams 98*a*-98*d* for selection, each corresponding to a sub-system 60. Selection icons 99 are provided—as shown, the user in this case has selected Team A and Team D, with the selection icons 99*b* indicating selection visually distinct from those 99*a* indicating not selected.

Figure 7A:
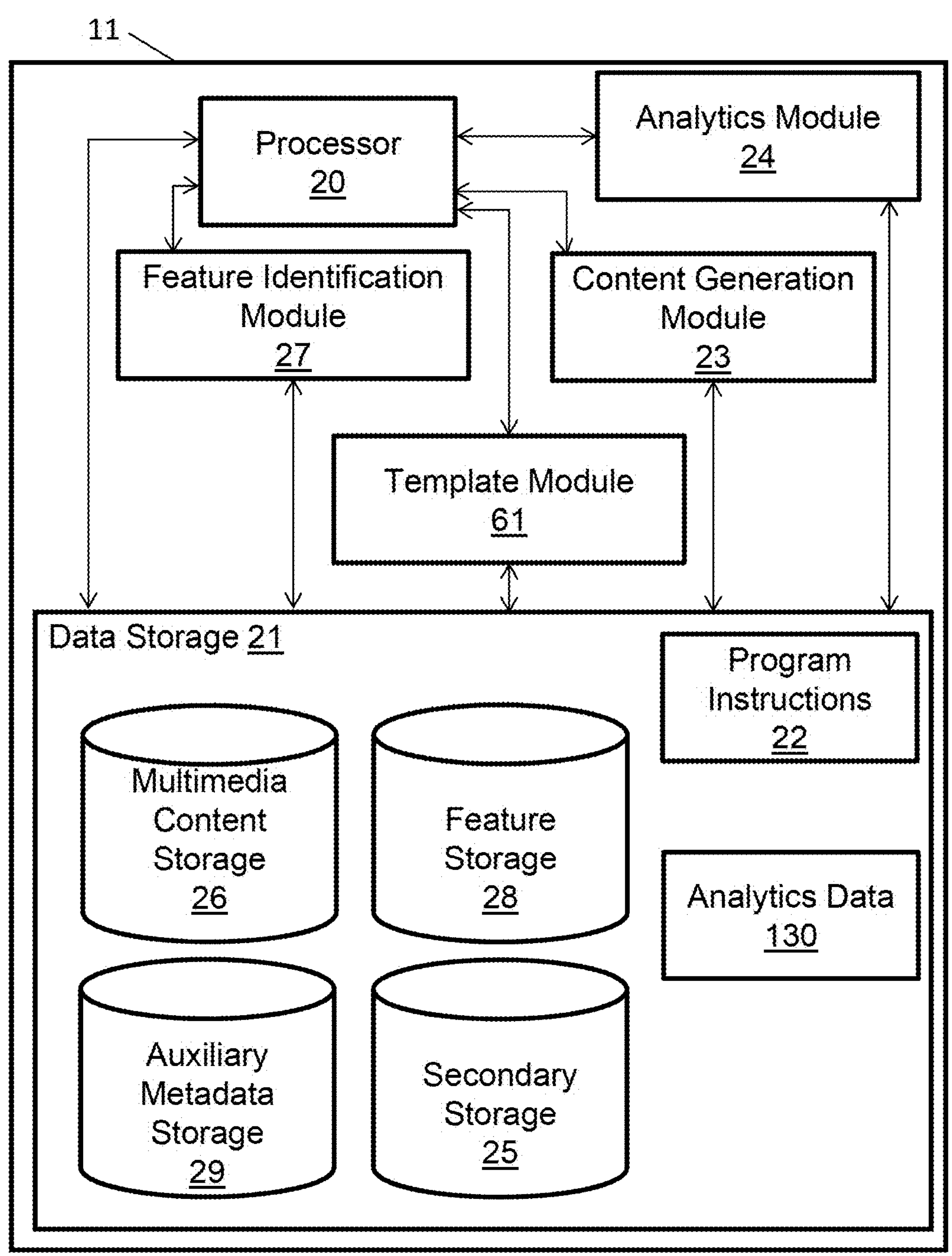
FIGS. 7A and 7B shows an embodiment in which secondary content creation is restricted (or optionally restricted) by a content owner using templates.
Figure 7B:
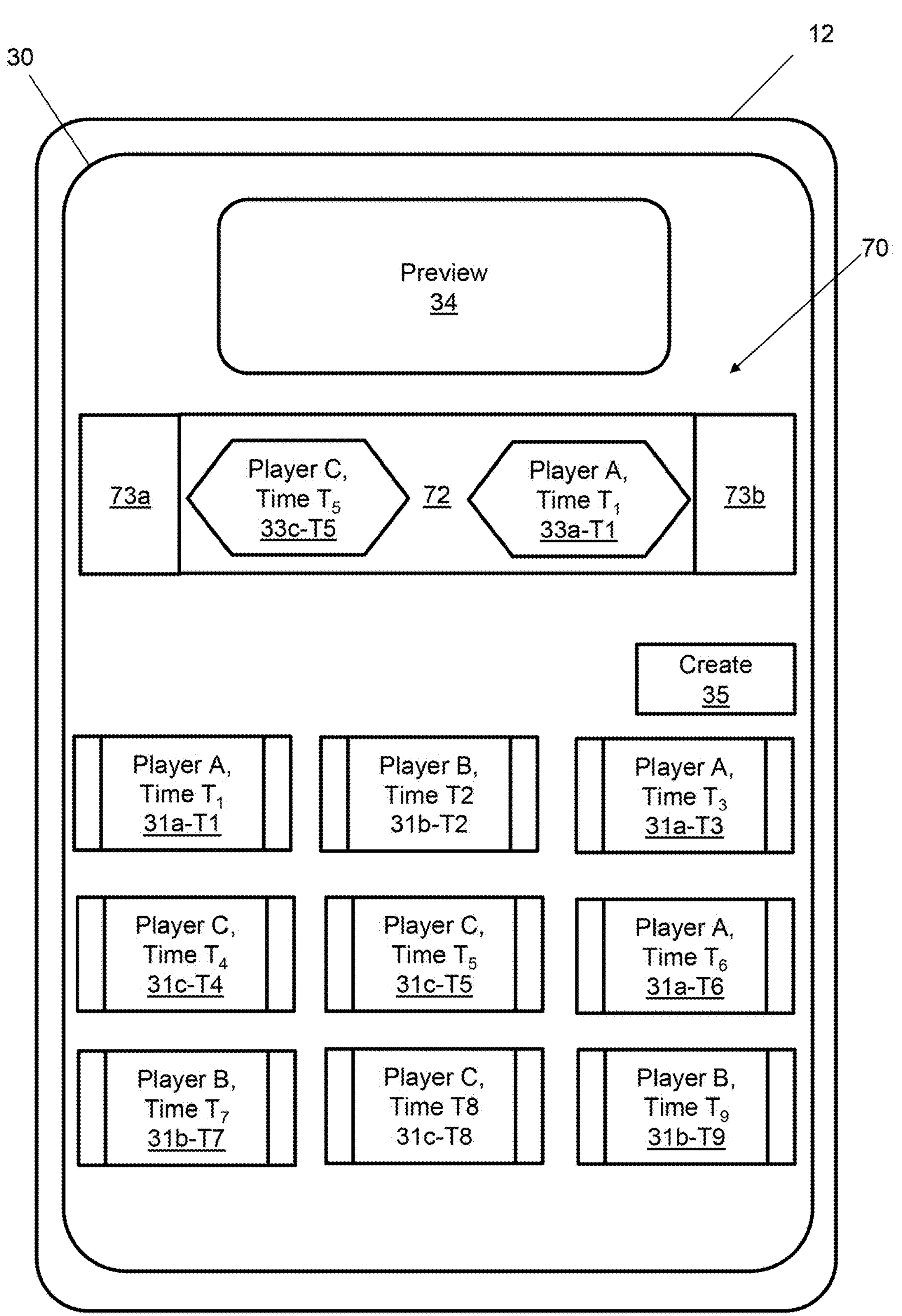

FIGS. 7A and 7B relate to an embodiment which can be considered an extension of that of FIG. 6, although can also be provided separately (e.g. without requiring separate logical sub-systems 60). In this embodiment, creating of secondary content is restricted according to an applicable template 70.

In FIG. 7A, the system 10 is shown comprising a template module 71. FIG. 7B shows a schematic representation of a template 70 data structure. In applicable embodiments, the template module 71 can be a common module 71 accessible to each of a plurality of sub-systems 60 with individual templates each associated with one or more of the sub-systems 60 or can be implemented as separate modules 71 for each sub-system 60. It should be understood that each option is functionally equivalent. Generally, particular templates can be available to one, several, or all content owners for making available to users.

A template 70 is a data structure defining rules for creating secondary content, wherein the rules can define the inclusion of certain content ("required content") which is not selectable by a user or, at least, provide a required content list from which a user must select one or more of the listed required content elements. It should be understood that the user is still enabled to create secondary content based on selections of desired feature instances (or associated clips 32), however, this selection is within the confines of the requirements of the template 70. The required content can be feature instances (or clips 32) stored within the system 10 (i.e. the required content can correspond to portions of primary content). However, the required content can also, or instead, correspond to suitable media that is not itself subject to the processing by the content server 11 defined herein. For example, a pool of media corresponding to advertisements, associated charities, or sponsorship media is expected to be useful but is not itself primary content within the meaning of the embodiments herein described.

FIG. 7B shows a representation of a template 70 in terms of the display 30 reference in FIGS. 4A-4F. In this example, the template 70 comprises user selectable regions 72 ("user regions 72") and content owner selectable regions 73 ("owner regions 73"). In this example, the content is a video and comprises a beginning and an end. The template 70 in this example defines first owner region 73*a* at the beginning and a second owner region 73*b* at the end of the video, with a user region 72 bookended by said first and second owner regions 73*a*, 73*b*. In this example, the user is enabled to select one or more feature instances (or clips 32) to add to the user region 62, with the order selectable by the user as described herein. Of course, other template 70 designs are possible, for example, a template 70 defining only one owner region 73, for example, located at the beginning or the end, or another location within the video. Similarly, more than two owner regions 73 can be defined. It should also be understood that two or more user regions 72 can be defined separated by an owner region 73. In certain implementations, a template 70 is defined having no content regions 73; this is effectively equivalent to having no template 70. In an embodiment, the template 70 can include rules defining the presence and arrangement of user regions 72 and/or owner regions 73; for example, the rule can specify one owner region 73 for every N (e.g. N=3) added feature instances (or clips 32), and rules defining ordering. The template 70 can also define a maximum or minimum number of feature instances (or clips 32) for a particular user region 72.

In the example shown, the user has selected certain features instances (corresponding to selected icons 33*c*-T5 and 33*a*-T1) for placement within the user region 72 of the template 72. The user is made aware, for example via a GUI of display 30, that additional content will be added at owner region 73*a* and 73*b* (which bookend the user's selected content—required content will play before and after the user selected content).

It should be understood that the user can add feature instances (or clips 32) to the user region(s) 72 defined by a template 70 according to the methods herein disclosed, for example with reference to FIGS. 2 and 3.

In an embodiment, templates 70 can define access to particular feature instances (or clips 32). For example, based on auxiliary metadata associated with the feature instances. This is similar to the embodiment disclosed with respect to FIG. 6, where the template 70 effectively comprises rules defining which content items can be returned as a result of a search query and/or selected to be added to a user region 72.

In an example of a use case, a template 70 is created associated with a particular event and/or player (or events/players). For example, an event might be a particular game, for example, between Team A and another team, Team B. Alternatively, the event could defined by a particular game type, such as a semi-final or final of a particular sports league and season. In terms of a particular player, the range of videos can effectively cover a plurality of events. For example, to celebrate a player's 100th game, a template 70 can be created associated with the player. Feature instances (or clips 32) can be limited to those associated with the event(s) or player(s) (or other entities), or the template 70 can simply require at least a minimum number of features instances (or clips 32) from the related event/player/entity.

In this example, the feature instances (or clips 32) made available for inclusion in the template 70 (at user region(s) 72) are those associated with the particular event(s) and/or player(s). For example, every content item associated with the particular game between Team A and another team. In another example, every content item in which the particular player is featured. Of course, additional rules are possible. For example, for a game between Team A and another team, the content items can be further restricted to certain players being present that were involved with the game. In another example, the content items available can be expanded to include previous games (which can be one or more selected games by the content owner) between Team A and the other team.

The available feature instances associated with a template 70 can be obtained via use of the search functionality described with reference to FIG. 3. The search can effectively be limited according to the template rules of the template 70—that is, the template rules effectively constitute search terms which effect to limit the results presented to a user. Therefore, the search can effectively be considered to comprise a combination of "(user search terms) AND (template rules search terms)".

In an embodiment, a plurality of templates 70 is effectively created from a reference template. For example, a content owner or in fact another user type to which several content owners are subservient can create a reference template that is applicable to all games involving Team A. A user can be enabled to select one (or one or more) game for secondary content creation, and a template 70 is created (or selected) which combines the reference template with the particular game(s) limitation. Therefore, templates 70 associated with different games involving Team A are consistent, differing in terms of the applicable content items available in dependence on the particular game.

In an embodiment, a template 70 can include restrictions related to the action of all users, or at least a plurality of users. For example, a template 70 can be made available by a content owner to a limited number of users on a first-come, first-served basis. This can advantageously enable a content owner to incentivize early creation of secondary content (a type of gamification). Similarly, in an embodiment, a template 70 can include other limitations such as only being available for a period of time or only available to a particular class of user (e.g. a premium user or a standard user, but not both).

A motivator for certain embodiments herein, which can be advantageous, is that Team A wishes to allow users (e.g. supporters of Team A) to generate secondary content but in a manner that is restricted, for example, by commercial considerations. An embodiment provides functionality that enables the generation of secondary content within such restrictions, for example via the use of templates 70. An additional benefit can be that a large number of users can create secondary content "at the same time" without overburdening system 10. Advantageously, for certain embodiments, the system 10 only stores secondary content metadata for creating secondary content each time a user creates new content; therefore, although many users can be creating secondary content, since it is based on a relatively small set of primary content, the approach of secondary content metadata avoids unnecessary duplication of stored media.

Although not shown, it is understood that the content owner can access content server 11 via their client device 12 (an authorisation procedure can identify the content owner as a content owner, rather than standard user). A GUI can be provided for designing templates 70, for example, by enabling defining of user regions 72 and owner regions 73 (and their temporal relationship) as well as defining template rules applying to the owner region(s) 73, user region(s) 72, and the content available for both.

Figure 8:
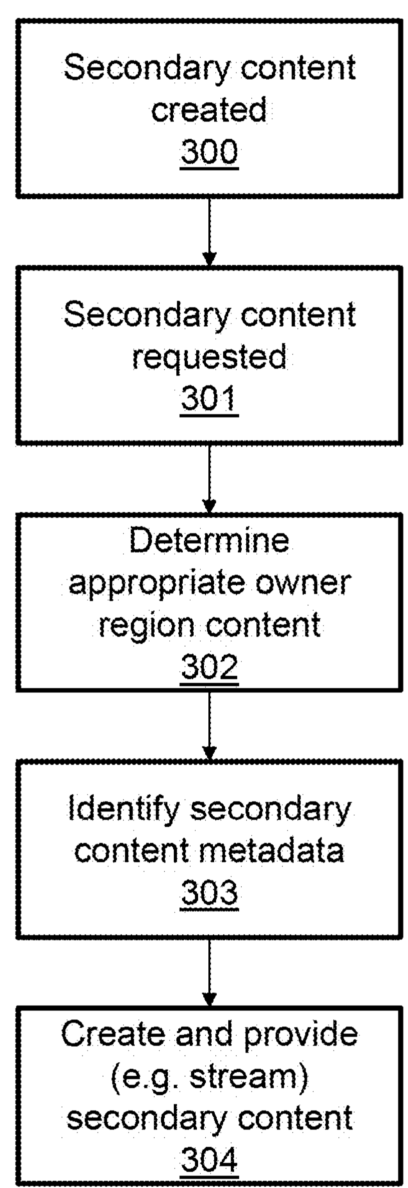
FIG. 8 relates to an embodiment enabling dynamic changes to secondary content.

Regarding the use of templates 70, FIG. 8 refers to an embodiment in which certain portions of secondary content is changeable—referred to herein as dynamic secondary content. This embodiment relies upon secondary content being created on-demand—that is, where the secondary content is defined by stored secondary content metadata and is created by obtaining feature instances or clips 32 from primary content when requested by reference to the secondary content metadata.

In effect, dynamic secondary content is defined by a portion selectable by a user (i.e. the one or more user regions 72) and a portion that is not selectable by a user but required according to the template 70 (and therefore, effectively selected by the content owner in the form of one or more owner regions 73 or can be selected by another user type to which the content owner is subservient). Advantageously, from the perspective of the user, it is the feature instances (or clips 32) making up the one or more user regions 72 which makes the resulting secondary content "theirs"—i.e. the impression to the user is that the secondary content was created by them. Therefore, the content associated with the one or more owner regions 73 (referred to above as required content) can be changed without affecting the perceived ownership of the secondary content by the user.

Therefore, the template 70 associated with a piece of secondary content can define the content of one or more owner regions 73 conditionally based on associated conditional rules, such that the one or more conditional owner regions 73 are assessed to determine suitable content each time the secondary content is created from the secondary content metadata. For example, the content of a particular owner region 73 can depend on the time at which the secondary content is delivered to a user device 12 (rather than when a particular user "created" the secondary content).

This example enables changes in the dynamic secondary content over time—for example, reflecting changes in sponsorship or simply to reflect the age of the secondary content. In another example, the content of a particular owner region 73 can depend on the state of the system 10—for example, the number of times new secondary content has been created using the particular template 70. This can enable, for example, promotional approaches to entice secondary content creation—for example, a particular piece of required content is made available to the first N (e.g. N=100) users to utilises a particular template 70 (which, like examples above, provides a mechanism to apply gamification ideas to the creation of secondary content—which can improve engagement with the content owner or associated entity such as a sports club or a particular player). That is, the particular choice of required content for one or more of the owner regions 73 depends on when the particular secondary content was "created".

Additionally, or alternatively, the template 70 can be updateable (e.g. by the associated content owner). For example, if a template 70 is associated with a particular sports team or player, it can be configured to provide content corresponding to a sponsor of that sports team or player. If the sponsor changes, then the template 70 can be updated such that future generation of the dynamic secondary content shows content associated with the new sponsor in one or more of the owner regions 73, rather than the earlier sponsor (e.g. the sponsor at the time a user creates the secondary content).

In this embodiment, the content server 11 can be configured, for example via a property of a particular template 70, to only provide the secondary content created by a user on demand—that is, the secondary content is not downloadable as a permanent file. At least, such a "download" is not provided as an explicit option although client devices 11 can have functionality to obtain a download in any event—a key idea is that this is not authorised by the content server 11.

Regarding on-demand secondary content, it can be shared by a user by providing a link (such as an embedded link) to the content server 11 identifying to the content server 11 the metadata associated with the secondary content. Therefore, the user can share the secondary content as desired without requiring those receiving the shared secondary content to necessarily access the content server 11 knowingly. For example, such a link could be shared to social media, via an email, SMS message, embedding in a website, or any other known technique. An API or other functional interface can be provided to third-party web services (such as social media or an entity's website (e.g. a sports team's website)) to facilitate sharing of content in this manner—that is, where the secondary content is created on demand and transmitted to the third-party webpage.

In FIG. 8, a piece of secondary content is created and stored as secondary content metadata, at step 300, for example by a user or even a content creator, according to techniques described herein. A request for that particular item of secondary content is received at step 301. For example, due to access to a particular link or via embedded content (or via a plugin) on a web site such as social media. Then, the template 70 associated with the secondary content is identified and appropriate rules applied to determine the appropriate required content for one or more of the owner regions 73 which are conditional, at step 302. The template 70 can be stored as part of the secondary content metadata or can be accessible by the content server 11.

Furthermore, it is envisaged that certain pieces of primary content can be updated over time, for example, by replacing an existing piece of primary content with a higher quality version of the same media. Advantageously, the use of secondary content metadata means that this update can be incorporated into the secondary content easily.

Figure 9:
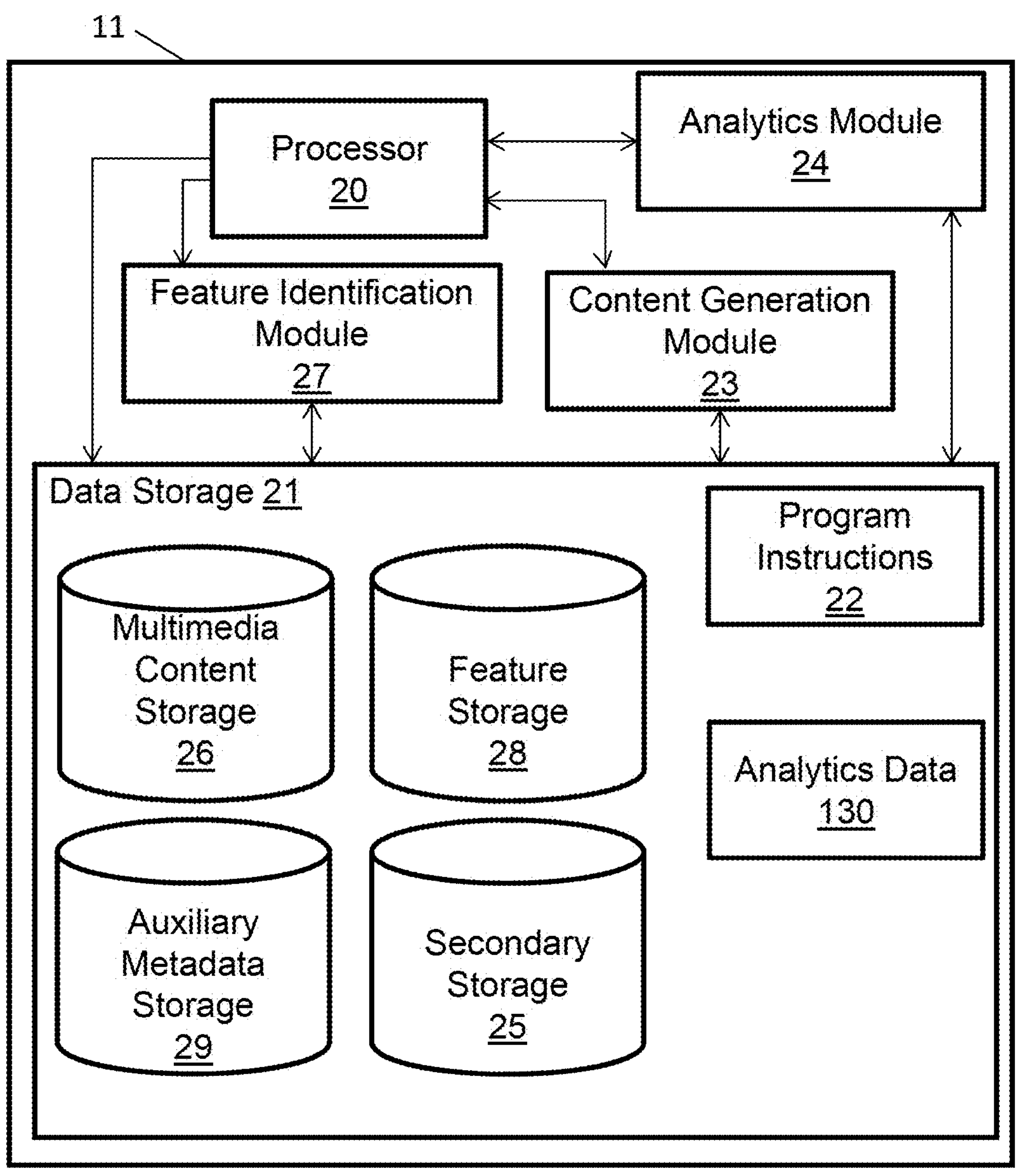
FIG. 9 shows an embodiment including an analytics module.

FIG. 9 shows a further embodiment of system 10 including an analytics module 24 which provides for the tracking of data in association with the creation of the secondary content. In general, in one embodiment, the analytics module 24 can be arranged to capture information on:

- the source of primary content uploaded to the content server 11 via from client devices 12 through communications network 15;
- users who engage with either or both of the primary content and the generated secondary content; and
- users who engage with the generated secondary content by sharing the generated secondary content beyond the content server 11, such as, for example, across social media platforms.

As a user uploads primary content onto the content server 11, the analytics module 24 is arranged to capture the IP address of the client device 12 from which the primary content was uploaded. Further, a user might be required to "log in" in order to access the features described herein and the analytics module 24 is arranged to associate each primary content upload to a specific identifiable account (including information such as name, username, email address and other existing data). This information relating to the identifiable account is stored in the data storage 21 and the content server 11 is arranged to retrieve this information when necessary. For example, a user may be required or optionally requested to include a piece of contact or identifying information such as a phone number of email address, which can be stored in analytics module 24 and may be utilised to identify multiple instances of access by the same user.

In an embodiment, once secondary content is generated using input from a user logged into the content server 11 via a client device 12, the analytics module 24 is arranged to capture the IP address of the client device 12 and match it to an identifiable account.

In one embodiment, the analytics module 24 is arranged to incorporate tracking metadata (such as a hidden hashtag and a blinking light) into the secondary content in embodiments in which the secondary content is made available for download, which cannot be deleted and such that:

- tracking of the secondary content, i.e. any sharing or download of the secondary content beyond the content server 11, can be enabled; and
- tracking of the identity of users who upload and/or engage with the secondary content at the content server 11 level, including tracking of the engagement duration and type of engagement, can be enabled.

Where the secondary content is generated on-demand (e.g. for streaming), then the analytics module 24 is also configured to record tracking information.

The analytics module 24 is therefore arranged to store program instructions executable by the processor 20 to extract analytics data associated with a distribution of the generated secondary content over external platforms, such as social media platforms, accessible through the communications network 15. Thus, whenever the secondary content is shared across the Internet, for example across social media platforms, the analytics module 24 is arranged to track the associated metadata and identify user engagement. For example, the analytics module 24 is arranged to identify and track who engages with (e.g., uploads, shares) the secondary content, and on which platform the secondary content is uploaded and shared. The data storage 21 is arranged to store the extracted analytics data in a respective analytics database (e.g. embodied with data storage 21), whereby a user can access the analytics data, for example, for research purposes.

Figure 10A:
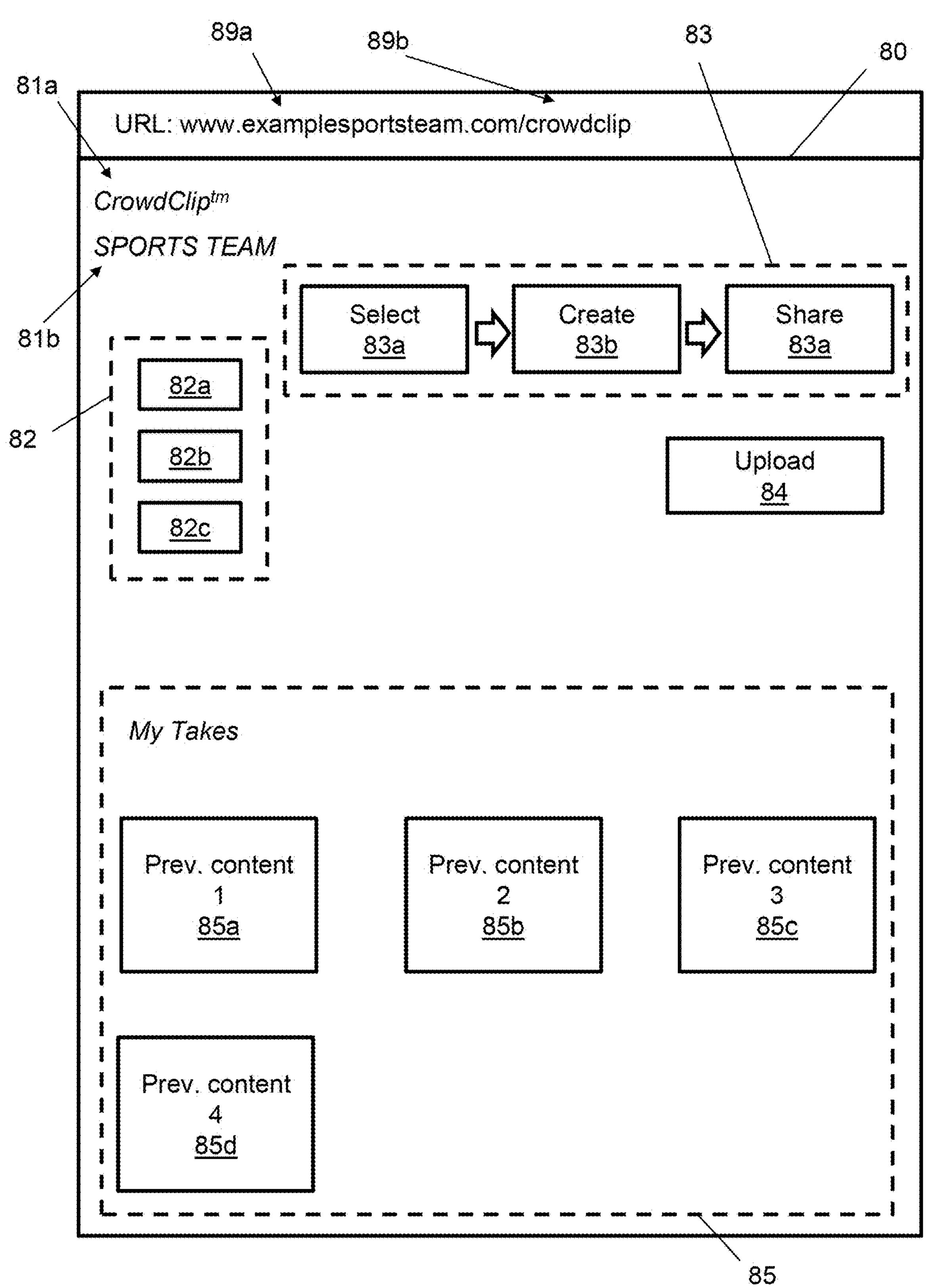
FIGS. 10A-10C relate to a homepage or other landing page for a user including previous user content and other user content suggestions, and suggested templates.

The embodiments described herein can advantageously provide a content platform accessible to various users. For example, FIG. 10A shows a user-specific "homepage" 80 accessible by a user when accessing the system 10 (or, equivalently, a particular sub-system 60 where applicable). The homepage 80 shown is representative and not intended to be limiting, and various features shown and described can be included or excluded as desired. The homepage 80 representation can be understood as being displayed on the display 30 of the user's client device 12. The homepage 80 in this example includes system operator branding 81*a* and content owner branding 81*b*, thereby representing the "brand integration" approach to sub-system 60 operating described herein—therefore, the homepage 80 in this particular case can be understood as associated with a sub-system 60. Also shown in this figure is the integration of the system 10 (e.g. via a sub-system 60) through the use of an integrated web resource 89*a*, 89*b*. In this example, the web resource comprises the web domain 89*a* of the sports team (corresponding to a content owner) with a specific resource reference 89*b* to the system operator/particular sub-system 60 (in the example, named after the present Applicant—that is, "CrowdClip"). For the content owner, the sub-system 60 can be integrated as a function within its website.

Figure 12:
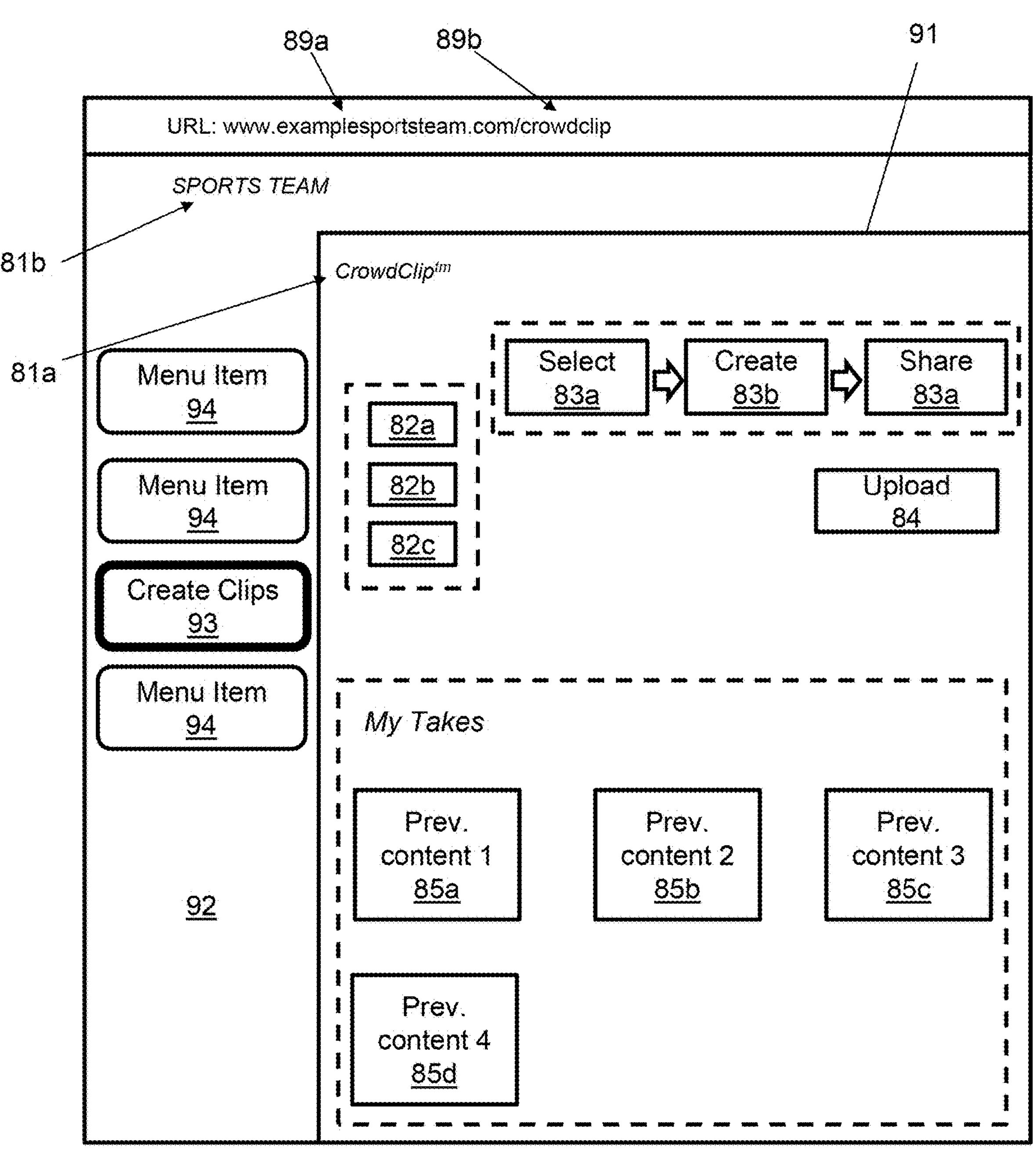
FIG. 12 shows an embodiment in which a sub-system 60 is integrated into a website of a content owner.

In this regard, in FIG. 12, there is shown a webpage 90 of the content owner having a content owner webpage portion 92 (shaded) and a sub-system 60 webpage portion 91 (corresponding to FIG. 10A with certain reference omitted for clarity). Also shown is a menu with a menu item highlighted 93 corresponding to the sub-system 60 ("Create Clips"), along with other menu items 94 related to other aspect of the content owner's website. Therefore, a user accessing the content owner's website is given the impression that the sub-system 60 is an integral part of the website, even thought the functionality is provided via an API, SDK, iFrame, or other approach to integrating a third-party offering, such as sub-system 60, into a website. Clicking the other menu items 94 will take the user away from the GUI related to the particular sub-system 60 (generally, the system 10). Note that, in this example, the content owner branding 81*b* is located in the a content owner webpage portion 92.

Homepage 80 includes a service selection area 82 enabling the user to move between different offered "services" by interacting with selection icons 82*a*-82*c*. For example, service selection area 82 and related selection icons 82*a*-82*c* can remain visible as the user moves between different "pages". The homepage 80 also has a stage indication area 83 representing which stage the user is at along a secondary content creation process. For example, there is shown a select indicia 83*a* (currently highlighted), create indicia 83*b*, and share indicia 83*c*.

There is also shown an "upload" button 84 and an array of one or more previous content icons 85*a*-85*d* in previous content area 85 (the particular number of previous content icons 85 will depend on the previous actions of the user—a facility to browse several "pages" of previous content icons 85 may be provided should insufficient space be available on the homepage 80). In this example, the previous content area 85 is labelled with "My Takes" which represents to the user the function of area 85. Depending on the implementation, the previous content icons 85 can correspond to previously uploaded primary content by the user and/or previously created secondary content by the user. Although not shown, the previous content icons 85 can separated into separate sections corresponding to primary content and secondary content respectively.

Figure 10B:
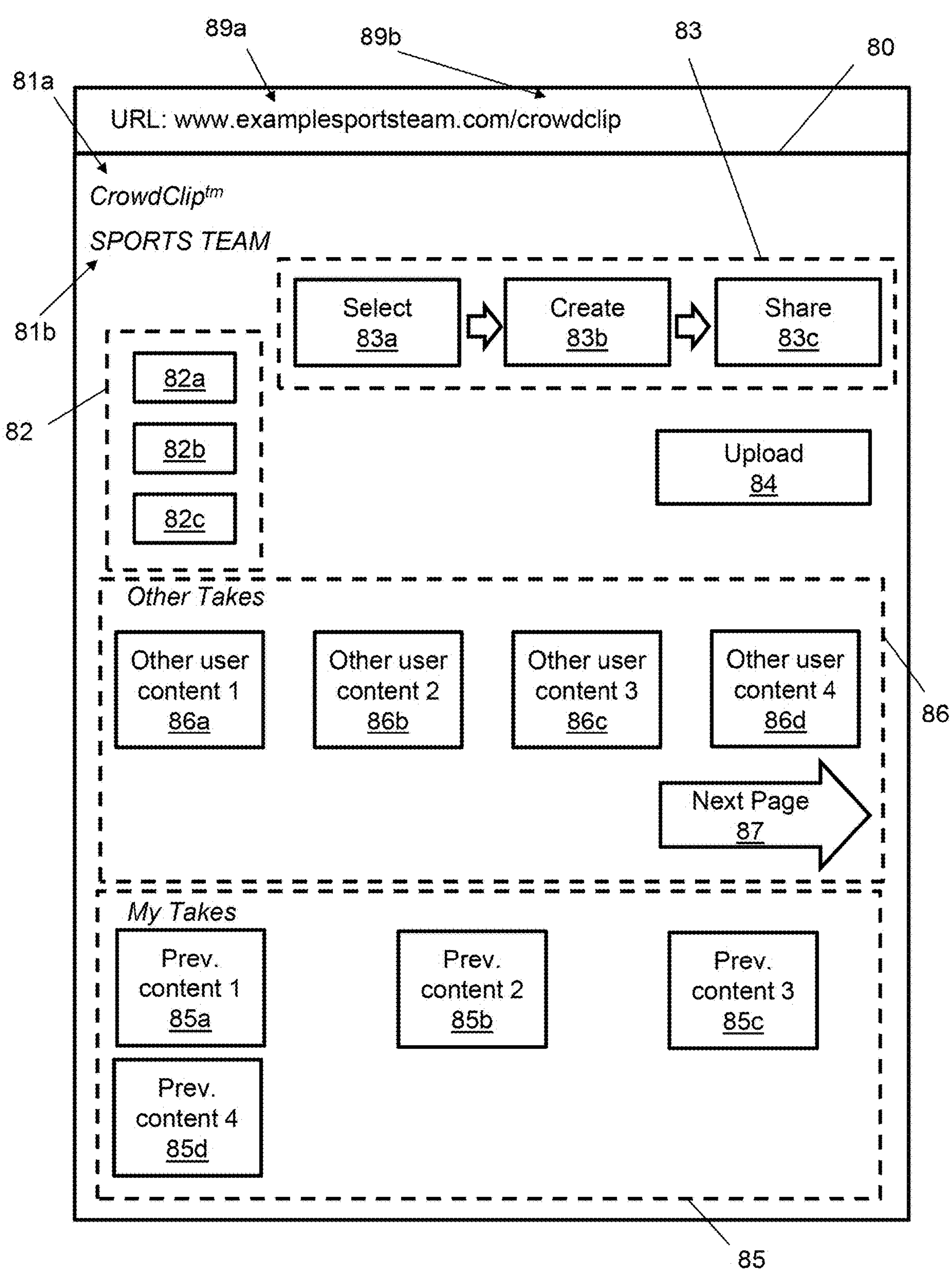

FIG. 10B shows an extension of FIG. 10A in which a further other user content section 86 is provided including other user content icons 86*a*-86*d* (generally, the number of other user content icons 86 can be set by a system rule or be predetermined), associated with primary content or secondary content uploaded or created by different users to the particular user. In this example, the other user content section 86 is labelled with "Other Takes" which represents to the user the function of area 86. Similar to the previous user icons 85, a facility to browse several "pages" of other user content icons 86 may be provided should insufficient space be available on the homepage 80 (in this case, illustrated with "next page" icon 87). The other user content icons 86*a*-86*d* represent content by other users which is determined to be of potential interest to the user. For example, this can be based in part on popularity of particular secondary content (in terms of views). In one embodiment, a user profile of the particular user is utilised in determining which other user content icons 86 are displayed (at least in part) this is described below).

The particular user can initiate a secondary content creation process by selecting the user's own or another user's icon 85, 86 when associated with secondary content previously created, which will take the user to a second screen in which the create indicia 83*b* is highlighted. Here, the user can be presented with an interface similar to display 30 of FIGS. 4A-4F to enable secondary content creation. In an embodiment, if a template 70 was utilised in creating the previous secondary content, it is pre-selected for use in the new secondary content creation. Furthermore, in an embodiment, the clips 32 and associated selected icons 33 that correspond to the clips 32 making up the previously created secondary content are preselected to advantageously provide motivation for the user. The user can simply "switch out" (e.g. replace) certain selected icons 33 (and therefore associated clips 32) with their own desired clips 32, while retaining any clips 32 that the user approves of. By also retaining the same template 70, a consistent approach to secondary content creation is achieved while encouraging "ownership" of secondary content by various users. For example, popular secondary content can provide motivation for additional secondary content creation, thereby facilitating distribution of the associated clips 32. Also advantageously, the content owner(s) of the primary content associated with particular clips 32 can obtain analytics information about the popularity of the clips 32.

In the example of FIGS. 10A and 10B, the "Share" indicia 83*c* represents the making of the secondary content available to others (e.g. via link provision or other means).

A similar interface to FIGS. 10A and 10B can be provided to a content owner, although additional functionality can be provided. For example, a page showing available templates 70 can be shown. The content owner can have access to a "distribute" function which essentially enables the content owner to make a combination of particular template 70 and one or more pieces of primary content available to associate users (e.g. users accessing via the associated sub-system 60).

Figure 10C:
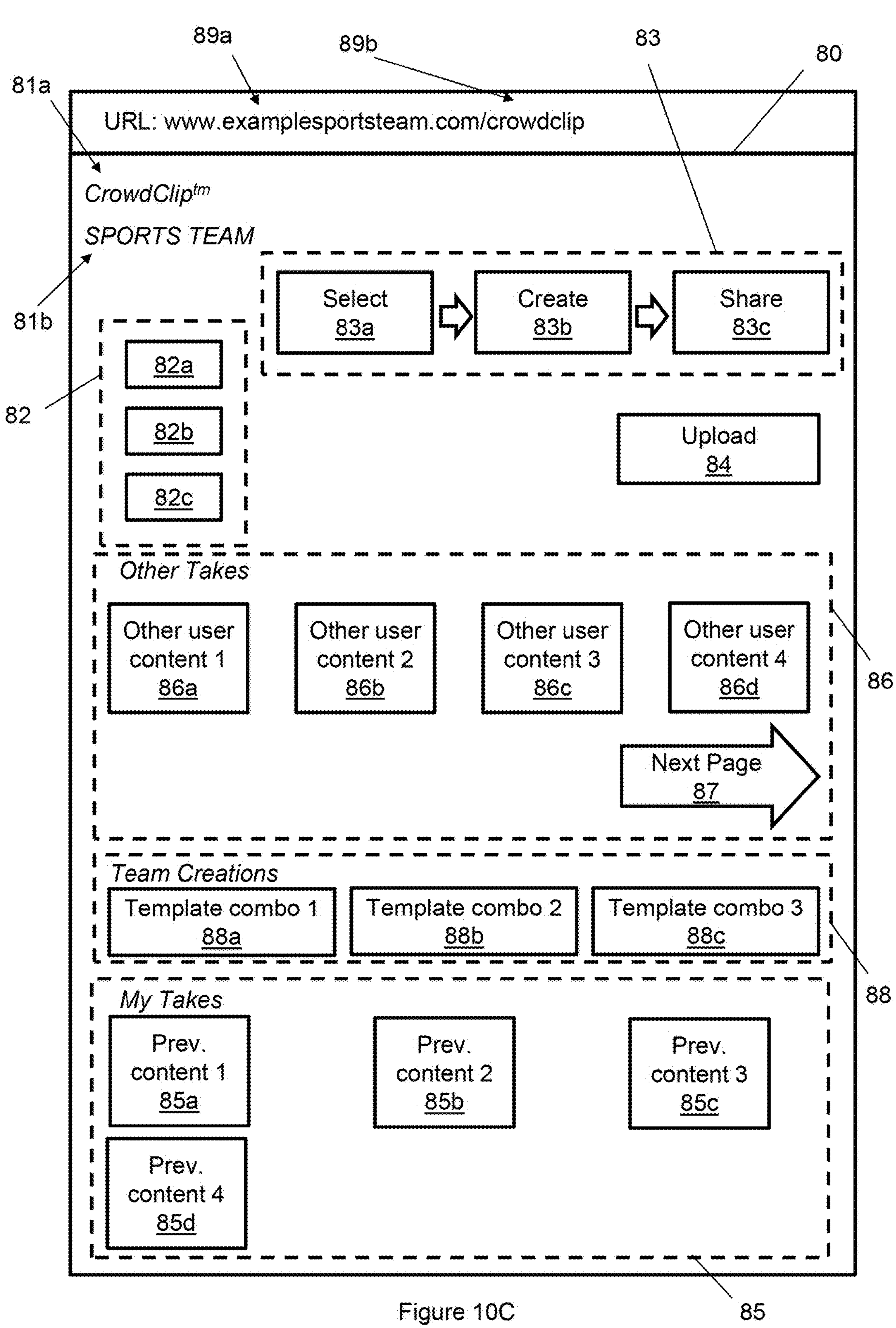

FIG. 10C shows a further variation in which a content owner section 88 is shown including distributed template icons 88*a*-88*c* on a user's homepage 80. Each distributed template icon 88*a*-88*c* corresponds to a combination of template 70 and primary content from which a user can create secondary content. These can be shown based on a conditional rule (e.g. certain combinations may only be available to a particular class of user, such as a "premium user", or for a particular amount of time).

Figure 11:
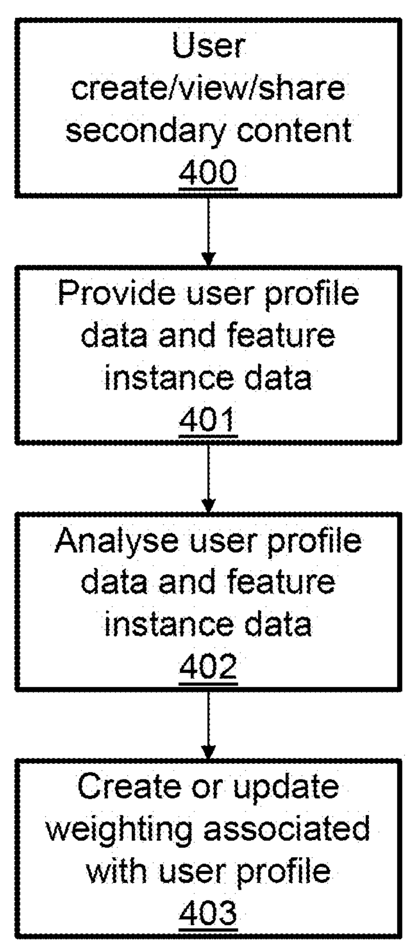
FIG. 11 shows an embodiment in which user actions are learnt for providing content suggestions to the user.

With reference to FIG. 11, in an embodiment, selections of clips 32 (i.e. specific feature instances) by users is utilised for future recommendation of particular features instances to either of both of particular users and classes of users.

At step 400, a user creates, views, or shares secondary content based on one or more specific feature instances, according to embodiments herein described. At step 401, user profile data and feature instance data is provided to a fan profile engine (which can be a function of the content server 11) to undertake a profile learning operation. The fan profile engine can comprise a machine learning algorithm configured for generating or modifying weightings associated with the algorithm in response to processing of the feature instance data. The weightings can be associated with the user and/or one or more user classes of the user.

The fan profile engine is configured for identifying patterns in the selection of specific feature instances made by the user. Therefore, over time, a "profile" can be built of the user in which predictions can be made as to what "new" content (e.g. new clips 32 associated with newly uploaded primary content) are likely to be of interest to the user. Here, "interest" should be understood as a likelihood to select a particular clip 32 (i.e. feature instance) for subsequent secondary content creation. The fan profile engine can also, or alternatively, build a user profile based on particular secondary content (e.g. made by other users) viewed by the user or, in particular, shared by the user.

The feature instance data typically comprises one or more of: access to the clip 32 associated with the feature instance; and access to the auxiliary data associated with the primary content of the clip 32 (either in full or in part). That is, information identifying characteristics of the clip 32. The user profile data typically includes any information available about the user, which at the very least comprises a unique identifier (which can be equal to user entered information such as an email address or phone number or derived therefrom)—generally, the user profile data should be consistently associable with a particular user such that a particular user is generally consistently identified between separate access instances to system 10.

The user profile data can comprise user provided data such as one or more of: age of the user; gender to which the user identifies; income of the user or their household; location of residence of the user; location of work of the user; relationship information; and favourite entities (e.g. favourite sports team). Generally, the data can be either or both of mandatory user profile data and optional user profile data. The user profile data can be set by a system operator or content owner (or both).

The user can be associated with one or more user classes—these are categories in which the user "fits". These can be predefined (e.g. males 20-30 years old) or learnt by the system 10.

At step 402, the user profile data and feature instance data are analysed by the fan profile engine which adjusts weightings associated with the user and/or one or more user classes based on the user profile data and feature instance data to reflect the choice of the particular feature instances for secondary content creation and/or for viewing or sharing where the secondary content has already been created. These weightings are stored in a suitable user database. It should be understood that the fan profile engine has access to previously updated weightings when performing step 402, such that previously learnt information about a user is incorporated into the new weightings.

Therefore, at step 403, the user weightings are updated (or, if the method is being performed for the first time for a user, the weightings are created). Said weightings are indicative of a "user profile" associated with the user.

A user's user profile can be utilised in instances where primary content and/or secondary content ("searched content") is being presented to the user in order to determine the searched content for presentation and/or the order of the searched content.

For example, regarding step 110 of FIG. 3, the user can undertake a search for feature instances and the results are ordered based, at least in part, on an assessment of a match value obtained by assessing the feature instances against the user profile. In one example, the ordering is based on the age of the feature instance, the similarity to the user's search terms, and the user profile according to a predefined weighting.

In another example, regarding other user content icons 86 of FIG. 10B, the selection and/or order of icons 86 can be determined at least in part based on an assessment of a match value obtained by assessing the feature instances associated with the other user content icons 86 against the user profile. For example, the selection can be weighted towards other user content icons 86 reflecting feature instances which are determined, according to an assessment with the user profile, to be of higher likely interest to the user.

A similar process can be applied with templates 70 in place of feature instances. That is, templates 70 selected by the user or corresponding to secondary content viewed or shared by the user are utilised in a learning procedure similar to step 302 and 303. Like feature instances, the templates 70 can be associated with template data indicative of one or more properties of the template 70, from which the user profile can be built. With reference to FIG. 10C, this can facilitate selection of particular distributed template icons 88 for presentation of the user's homepage 80

Generally, a user can be identified if logged into the system 10 (equivalently, to a particular sub-system 60). This can comprise providing user account details. A user can also be identified without "logging in" as such such—for example, by being asked to provide an identifier such as an email address or phone number. This latter case may be applicable to "new" users who are accessing secondary content shared by existing users, before said new users actively up "sign up" to the system 10. Therefore, a user profile can be built for a user before that user signs up to the system 10—this can be advantageous in that the user can be provided an "optimal" initial experience based on the user profile information. That is, content can be curated for the user before the user has created their own secondary content.

When utilising user content for searched content for presentation to the user, alternatively or in addition to the user's specific user profile, the results can be determined at least in part based on one or more classes of the user.

An advantage of the embodiment of FIG. 11 can be an improved user experience which is informed by the interaction the user has with system 10. Advantageously, the improvement is based on system 10 being both a content upload (primary content), content creation (secondary content), and content distribution system which enables multiple points of user assessment when developing the user profile.

The system 10 can advantageously provide a content creation platform not only for users, but also for content owners. The system 10 thereby provides an ability for a content owner to define an approach to content creation which is consistent with predefined rules, such as brand guidance. This can be achieved via the combination of access to primary content and the use of templates 70. For example, a particular content owner can be enabled to make certain primary content only useable with particular defined template(s) 70 therefore ensuring consistent in the secondary content thereby created. The system 10 (e.g. via sub-system 60) therefore provides a single point for content storage (primary content, templates 70 which can represent business assets), upload, editing, and secondary content creation. In this sense, a content owner can also be a "user" that is bound by the same templates 70 when creating secondary content. Considering embodiments having dynamic secondary content, the system 10 further advantageously enables content owners to "update" its brand guidance in a manner that not only affects future secondary content creation, but the provision of existing secondary content. Where secondary content has been cached or permanently stored (e.g. due to popularity), an update to the associated template 70 content can cause the cached or stored secondary content to be regenerated according to the updated template 70.

As also mentioned, another advantage of certain embodiments can be that users are provided with a feeling of "ownership" of secondary content, despite being created within restrictions defined by a template 70 (e.g. including advertising or other owner content which is not selected by the user as such). This feeling of ownership is expected to result in users being more inclined to actively share secondary content, thereby facilitating the sharing of particular clips 32 that may drive engagement with the band of the content owner—for example, by encouraging visits to a web page associated with the brand/content owner when implemented as a white-label or brand integration approach. A further advantage may be that, by sharing their own secondary content, users indirectly increase viewership of assets, such as media for example particular clips 32, owned/controlled by content owners (e.g. for a particular sports team). Therefore, users may advantageously be incentivised to assist the content owner in improving viewership of the content owner's assets in a natural manner—that is, by taking ownership of their own secondary content, users may advantageously be more inclined to share particular assets of a content owner than would otherwise necessarily be the case.

Another advantage of the white-label or brand integration approach is that users can be encouraged to visit the website of the content owner which can have secondary benefits such as representing to search engines an increased popularity of said website—therefore, an advantage may be represented in improved placement within search results with various search engines (similar to undertaking search engine optimisation (SEO)). A similar benefit can result from an app-based approach where an associated app is downloaded more often as a result of the provision of secondary content creation functionality, thereby improving the representation of popularity of the app in an associated app store.

Embodiments of the present invention present the advantage that the hardware of a user's computing device is neither used for processing the multimedia content nor for storing data associated with the performance of the methods herein described implemented by the content server 11.

Advantageously, the system 10 described can enable the system operator of the system 10 to manage computing resources while providing content creation facility to a large number of users. A particular realisation is that in certain use cases, there can be a significantly larger quantity of secondary content than primary content. For example, if a content owner wishes to encourage secondary content creation from a particular piece of controlled primary content (e.g. an entire sports match or selected portions thereof), then it may be expected that many users (e.g. fans of the associated sports team) will desire to create secondary content from the same primary content. In a lot of cases, the secondary content thereby created is expected to be "shared" a relatively small number of times—e.g. on the particular fan's social media and to their contacts, but not more broadly). Advantageously, embodiments herein described acknowledge this feature of the secondary content by creating it "on-demand" from secondary content metadata referencing the associated primary content rather than storing the secondary content itself—it is expected that it is more resource efficient (e.g. regarding both processing and storage resources) to store the secondary content as secondary content metadata and generate it "on-demand" than permanently store all of the secondary content as individual media files.

As mentioned, in an embodiment, popular secondary content can be "cached" or otherwise stored permanently or at least relatively permanently. Additionally, secondary content can be cached for a period of time after it is created on-demand in case other users request access shortly afterwards—this can reflect that there is a higher demand for secondary content shortly after it is shared than in the long term. Particularly popular secondary content may be in high demand for a particularly large amount of time, which is why permanent storage of the media itself may be preferred—however, it is expected that in the use-case described, that this will be relatively rare.

In embodiments having auxiliary metadata, a benefit can be provided by allowing for relatively fine detail to be associated with primary content (which can then flow on to secondary content derived from the primary content). Generally, the "categories" of auxiliary metadata can be set by a system operator of system 10 and/or a content owner of a sub-system 60, or can be created as needed by users. Auxiliary metadata can advantageously provide a facility for improved search for particular clips 32 by users by enabling specificity in search terms. Auxiliary metadata can advantageously provide a facility for improved management for a content owner of creation of secondary content for enabling the content owner a wide range of rules to specify in relation to templates 70. For example, auxiliary data categories can include a particular event, date of event(s), location of event(s) such as a particular stadium, competition (e.g. specified by sport code and/or year), etc. Auxiliary data can be combined with features such to improve searching and/or templates 70, for example, by enabling defining of a combination of feature(s) (e.g. player X) and auxiliary data (e.g. at stadium Y). In an implementation, a user can combine primary content when creating secondary content—one piece of primary content may be a "current" piece (e.g. a more recent sports game) whereas the other piece(s) of primary content are separate to the current piece—these can be referred to as "archive footage". In one example, a template 70 can specify that a user must use at least one clip 32 from the current piece and may use one or more pieces of archive footage (the specific archive footage available can be restricted, as described herein).

In embodiments utilising sub-systems 60, a single user can be associated with multiple sub-systems 60. For example, the system 10 can include information on a user and when the user "signs up" to particular sub-system(s) 60, the user's system 10 profile is essentially shared with the newly signed sub-system 60 rather than creating a whole new user profile. Therefore, a user's homepage 80 (for example) can represent content associated with different sub-systems 60. This can be represented on a single page or the user can be enabled to switch between representations of various sub-systems 60 (e.g. via selection icons 82). This implementation can be advantageous in respect of tracking and user profile building.

It will be understood that the processor 20 can comprise one or more processors arranged to execute program instructions as described above. In particular, it is envisaged that various modules and processes are implemented by the same or different processors and data storages arranged to store program instructions executable by the respective processor, wherein the system 10 further comprises a control unit in communication with the data storage 21 and arranged for controlling the operations of the processor 20.

Further modifications can be made without departing from the spirit and scope of the specification. The skilled person will understand that various different features and embodiments described herein can be combined.

The invention claimed is:

1. A method for generating secondary content implemented by a content server having a data storage, the method comprising the steps of:

storing, in the data storage, one or more pieces of primary content received by the content server, wherein received pieces of primary content are processed to identify a set of one or more feature instances, each feature instance associated with a predefined feature and defining a position within the respective piece of primary content at which said associated feature is present;

receiving, from a first client device in data communication with the content server, a search request, the search request specifying one or more search features;

determining one or more pieces of primary content for searching in relation to the search request;

identifying one or more feature instances in the searched primary content having an associated feature instance corresponding to one or more search features;

communicating an instruction to the first client device to display on a user interface of the client device a representation of the identified one or more feature instances;

receiving, from the first client device, an ordered selection of one or more of the identified feature instances;

determining for the, or each, selected identified feature instance a corresponding media portion corresponding to a portion of the primary media defined by the position associated with the particular selected feature instance;

creating a secondary content metadata defining, according to the ordered selection, the combination of the one or more determined media portions, thereby defining secondary content being media content capable of creation from the combination of media portions;

storing the secondary content metadata in the data storage of the content server without permanently storing the secondary content, wherein the secondary content metadata enables the content server, in response to a request from a client device, to subsequently generate the secondary content by obtaining and extracting the defined media portions from the primary content stored in the data storage and merging the extracted portions; and providing a template defining rules for creating secondary content, wherein the rules confine the generated secondary content to include one or more required content elements, the one or more required content elements being selectable by a content owner from a media pool comprising the set of one or more feature instances and a pool of media that is not derived from the received pieces of primary content, wherein the template further defines an arrangement on the user interface of the client device of one or more user regions and one or more owner regions, wherein the one or more user regions each allow for a user to select, via the client device, feature instances for the user region when creating a secondary content, whereas the one or more owner regions each display one of the one or more required content elements.

2. The method of claim 1, further comprising the step of:

streaming the secondary content to the requesting client device.

3. The method of claim 1, wherein the template defines at least one of the one or more owner regions as a conditional owner region comprising condition required content, and wherein the method further comprises:

the content owner determining, for the at least one conditional owner region, required content for use with the conditional owner region during constructing the secondary content based on conditional rules associated with the conditional owner region.

4. The method of claim 1, wherein the identified one or more feature instances include at least a first identified feature instance from a first piece of primary content and a second identified feature instance from a second piece of primary content different to the first piece of primary content.

5. The method of claim 1, further comprising the steps of:

providing an interface to receive pieces of primary content from client devices; and upon receiving a piece of primary content:

processing the received piece of primary content to identify a set of feature instances, each feature instance associated with a feature and defining a position within the respective piece of primary content at which said associated feature is present.

6. The method of claim 5, further comprising receiving, from the client device, a user selection of one or more features, and identifying features instances associated with the one or more user selected features.

7. The method of claim 1, further comprising providing one or more sub-systems, wherein a client device interacts with a sub-system when interacting with the content server, each associated with a content owner, where the content owner of a particular sub-system is enabled to control access to primary content to users accessing its associated sub-system and/or control the creation of secondary content by said users.

8. The method of claim 1, wherein the primary content and the secondary content comprise video media.

9. A method according to claim 1, wherein the arrangement of one or more user regions and one or more owner regions reflects the temporal positions of the defined media portions and one or more required content elements in the generated secondary content.

10. A content creation system comprising a content server in network communication with one or more client devices via a network, the content server configured to:

store, in a data storage of the content server, one or more pieces of primary content received by the content server, wherein received pieces of primary content are processed by the content server to identify a set of one or more feature instances, each feature instance associated with a predefined feature and defining a position within the respective piece of primary content at which said associated feature is present;

receive, from a first client device in data communication with the content server, a search request, the search request specifying one or more search features;

determine one or more pieces of primary content for searching in relation to the search request;

identify one or more feature instances in the searched primary content having an associated feature instance corresponding to one or more search features;

communicate an instruction to the first client device to display on a user interface of the client device a representation of the identified one or more feature instances;

receive, from the first client device, an ordered selection of one or more of the identified feature instances;

determine, for the, or each, selected identified feature instance a corresponding media portion corresponding to a portion of the primary media defined by the position associated with the particular selected feature instance;

create secondary content metadata defining, according to the ordered selection, the combination of the one or more determined media portions, thereby defining secondary content being media content capable of creation from the combination of media portions; and store the secondary content metadata in the data storage of the content server without permanently storing the secondary content, wherein the secondary content metadata enables the content server, in response to a request from a client device, to subsequently generate the secondary content by obtaining and extracting the defined media portions from the primary content stored in the data storage and merging the extracted portions; and provide a template defining rules for creating secondary content, wherein the rules confine the generated secondary content to include one or more required content elements, the one or more required content elements being selectable by a content owner from a media pool comprising the set of one or more feature instances and a pool of media that is not derived from the received pieces of primary content, wherein the template further defines an arrangement on the user interface of the client device of one or more user regions and one or more owner regions, wherein the one or more user regions each allow for a user to select, via the client device, feature instances for the user region when creating a secondary content, whereas the one or more owner regions each display one of the one or more required content elements not selectable by the user.

11. The system of claim 10, wherein the content server is further configured to:

stream the secondary content to the requesting client device.

12. The system of claim 10, wherein the template defines at least one of the one or more owner regions as a conditional owner region comprising condition required content, and wherein the content server is further configured to:

receive a determination from a content owner, for the at least one conditional owner region, of required content for use with the conditional owner region when constructing the secondary content based on conditional rules associated with the conditional owner region.

13. The system of claim 10, wherein the identified one or more feature instances include at least a first identified feature instance from a first piece of primary content and a second identified feature instance from a second piece of primary content different to the first piece of primary content.

14. The system of claim 10, wherein the content server is further configured to:

provide an interface to receive pieces of primary content from client devices;

upon receiving a piece of primary content:

process the received piece of primary content to identify a set of feature instances, each feature instance associated with a feature and defining a position within the respective piece of primary content at which said associated feature is present.

15. The system of claim 14, wherein the content server is further configured to receive, from the client device, a user selection of one or more features, and identify features instances associated with the one or more user selected features.

16. The system of claim 10, wherein the content server is further configured to provide one or more sub-systems, wherein a client device interacts with a sub-system when interacting with the content server, each associated with a content owner, where the content owner of a particular sub-system is enabled to control access to primary content to users accessing its associated sub-system and/or control the creation of secondary content by said users.

17. The system of claim 10, wherein the primary content and the secondary content comprise video media.

18. A non-transient computer readable storage medium comprising code configured to cause a computer processor to generate secondary content in a data storage interfaced with the computer processor, wherein the code is configured to cause the processor to:

store, in a data storage of the content server, one or more pieces of primary content received by the content server, wherein received pieces of primary content are processed by the content server to identify a set of one or more feature instances, each feature instance associated with a predefined feature and defining a position within the respective piece of primary content at which said associated feature is present;

receive, from a first client device in data communication with the content server, a search request, the search request specifying one or more search features;

determine one or more pieces of primary content for searching in relation to the search request;

identify one or more feature instances in the searched primary content having an associated feature instance corresponding to one or more search features;

communicate an instruction to the first client device to display on a user interface of the client device a representation of the identified one or more feature instances;

receive, from the first client device, an ordered selection of one or more of the identified feature instances;

determine, for the, or each, selected identified feature instance a corresponding media portion corresponding to a portion of the primary media defined by the position associated with the particular selected feature instance;

create secondary content metadata defining, according to the ordered selection, the combination of the one or more determined media portions, thereby defining secondary content being media content capable of creation from the combination of media portions; and store the secondary content metadata in the data storage of the content server without permanently storing the secondary content, wherein the secondary content metadata enables the content server, in response to a request from a client device, to subsequently generate the secondary content by obtaining and extracting the defined media portions from the primary content stored in the data storage and merging the extracted portions; and provide a template defining rules for creating secondary content, wherein the rules confine the generated secondary content to include one or more required content elements, the one or more required content elements being selectable by a content owner from a media pool comprising the set of one or more feature instances and a pool of media that is not derived from the received pieces of primary content, wherein the template further defines an arrangement on the user interface of the client device of one or more user regions and one or more owner regions, wherein the one or more user regions each allow for a user to select, via the client device, feature instances for the user region when creating secondary content, whereas the one or more owner regions each display one of the one or more required content elements.

* * * * *